United States Patent
Yoshida et al.

(10) Patent No.: US 10,607,337 B2
(45) Date of Patent: Mar. 31, 2020

(54) OBJECT INSPECTION SYSTEM AND OBJECT INSPECTION METHOD

(71) Applicant: FANUC CORPORATION, Yamanashi (JP)

(72) Inventors: Junichirou Yoshida, Yamanashi (JP); Fumikazu Warashina, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/212,689

(22) Filed: Dec. 7, 2018

(65) Prior Publication Data
US 2019/0197676 A1    Jun. 27, 2019

(30) Foreign Application Priority Data

Dec. 21, 2017  (JP) .................. 2017-245290

(51) Int. Cl.
*G06T 7/00*    (2017.01)
*G06T 7/73*    (2017.01)
*G06T 7/33*    (2017.01)

(52) U.S. Cl.
CPC .............. *G06T 7/001* (2013.01); *G06T 7/33* (2017.01); *G06T 7/337* (2017.01); *G06T 7/74* (2017.01); *G06T 7/97* (2017.01); *G06T 2207/20224* (2013.01); *G06T 2207/30164* (2013.01)

(58) Field of Classification Search
CPC .. G06T 7/001; G06T 7/33; G06T 7/38; G06T 7/74; G06T 7/97; G06T 7/337; G06T 2207/20224; G06T 2207/30164
USPC ................................................... 382/141, 294
See application file for complete search history.

(56) References Cited

U.S. PATENT DOCUMENTS

| | | | | |
|---|---|---|---|---|
| 8,396,329 | B2 * | 3/2013 | Brooksby | .......... G01N 21/9515 382/151 |
| 2016/0379357 | A1 * | 12/2016 | Takazawa | ............. G06T 7/0004 348/86 |

FOREIGN PATENT DOCUMENTS

| | | |
|---|---|---|
| JP | H5-301183 A | 11/1993 |
| JP | 2007-240434 A | 9/2007 |
| JP | 2017-15396 A | 1/2017 |
| JP | 2017-203701 A | 11/2017 |

* cited by examiner

*Primary Examiner* — Daniel G Mariam
(74) *Attorney, Agent, or Firm* — Hauptman Ham, LLP

(57) ABSTRACT

An object inspection system enabling a quick and easy registering of a master image and an inspection image when there is a displacement between the master image and the inspection image. The object inspection system includes an imaging section, a movement machine configured to move a first object or a second object and an imaging section relative to each other, a positional data acquisition section configured to acquire positional data of the movement machine when the movement machine disposes the first object or the second object and the imaging section at a relative position, an image data acquisition section configured to acquire a first image of the first object and a second image of the second object, and an image registering section configured to register the first image and the second image.

13 Claims, 30 Drawing Sheets

10,100

FIG. 13
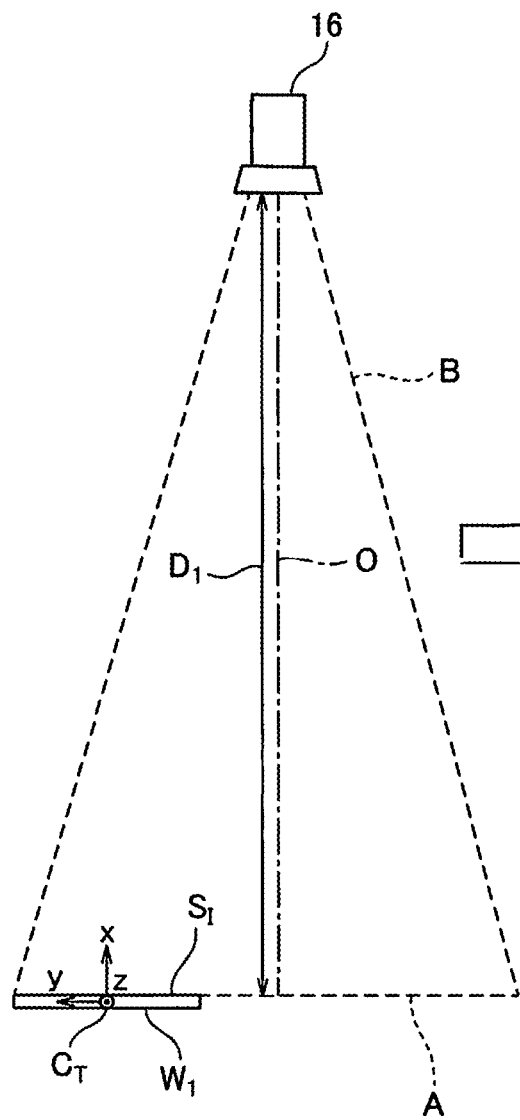
(a)
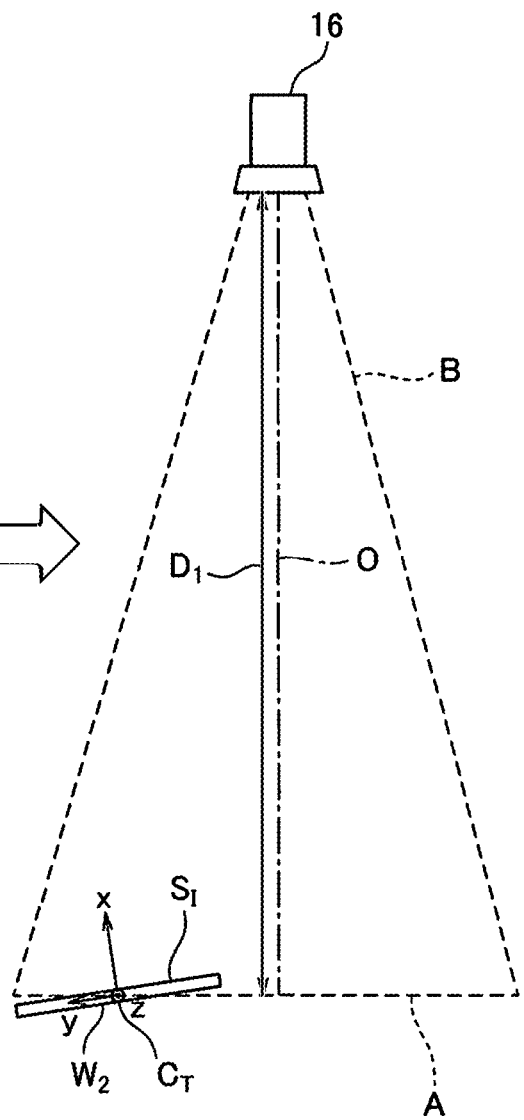
(b)

OBJECT INSPECTION SYSTEM AND OBJECT INSPECTION METHOD

RELATED APPLICATIONS

The present application claims priority of Japanese Application Number 2017-245290, filed on Dec. 21, 2017, the disclosure of which is hereby incorporated by reference herein in its entirety.

BACKGROUND OF INVENTION

1. Technical Field

The invention relates to an object inspection system and an object inspection method.

2. Background Art

Object inspection systems that capture images of the surface of an object such as a workpiece and inspect the surface of the object are known (e.g., Japanese Unexamined Patent Publication (Kokai) No. 2017-015396).

Such object inspection systems acquire a master image of the object that serves as a reference, acquire the inspection image of the object to be inspected, and carry out an inspection based on a comparison of the two images to see whether there is any visually recognizable error in the object to be inspected relative to the reference object.

A displacement may occur between the master image and the inspection image in such a case. A technique has been desired for a quick and easy registering of the master image and the inspection image in case of such a displacement.

SUMMARY OF INVENTION

In an aspect of the present disclosure, the object inspection system includes an imaging section configured to image a first object and a second object which have a common outer shape; a movement machine configured to move the first object or the second object and the imaging section relative to each other; a positional data acquisition section configured to acquire first positional data of the movement machine when the movement machine disposes the first object and the imaging section at a first relative position, and acquire second positional data of the movement machine when the movement machine disposes the second object and the imaging section at a second relative position; an image data acquisition section configured to acquire a first image of the first object imaged by the imaging section at the first relative position, and acquire a second image of the second object imaged by the imaging section at the second relative position; and an image registering section configured to register the first image and the second image with each other in an image coordinate system of the imaging section, using the first positional data, the second positional data, and a known positional relation between the image coordinate system and a movement machine coordinate system of the movement machine, wherein the object inspection system is configured to inspect whether or not there is a visually recognizable error in the second object with respect to the first object, based on the first image and the second image that are registered with each other.

In another aspect of the present disclosure, an object inspection method includes acquiring first positional data of a movement machine when the movement machine disposes a first object and an imaging section at a first relative position; acquiring a first image of the first object imaged by the imaging section at the first relative position; acquiring second positional data of the movement machine when the movement machine disposes a second object and the imaging section at a second relative position, the first object and the second object having a common outer shape; acquiring a second image of the second object imaged by the imaging section at the second relative position; registering the first image and the second image with each other in an image coordinate system of the imaging section, using the first positional data, the second positional data, and a known positional relation between the image coordinate system and a movement machine coordinate system of the movement machine and; and inspecting whether or not there is a visually recognizable error in the second object with respect to the first object, based on the first image and the second image that are registered with each other.

According to an aspect of the present disclosure, when there is a displacement between the master image and the inspection image, the two images can be registered using positional data of the movement machine. This reduces the task of registering and shortens the time for the task.

BRIEF DESCRIPTION OF DRAWINGS

FIG. 13 is a diagram for describing the positional relations between the objects and the imaging section at a time of image capture of the inspection image illustrated in FIG. 12, Section (a) of FIG. 13 illustrating the positional relation between the first object and the imaging section at a time of image capture of the master image, Section (b) of FIG. 13 illustrating the positional relation between the second object and the imaging section at a time of image capture of the inspection image.

DETAILED DESCRIPTION

Figure 1:
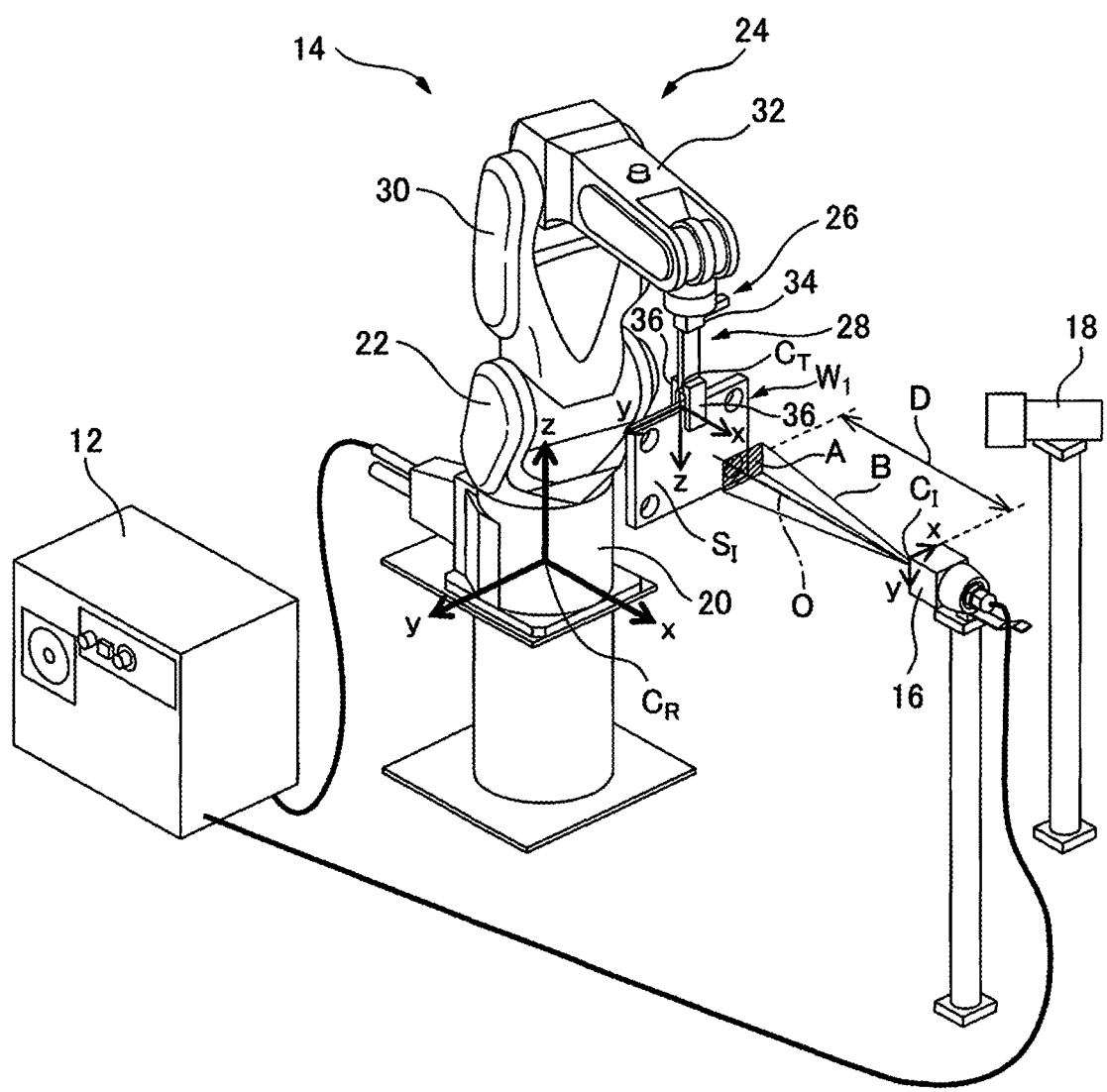
FIG. 1 is a diagram illustrating an object inspection system according to an embodiment.

In the following, embodiments of the present disclosure will be described in detail with reference to the drawings. In the various embodiments described below, similar elements are assigned the same reference numerals, and the redundant descriptions thereof will be omitted. First, with reference to FIGS. 1 to 3, an object inspection system 10 according to an embodiment will be described.

The object inspection system 10 includes a controller 12, a movement machine 14, an imaging section 16, and a lighting device 18. The controller 12 includes e.g. a CPU and a storage (not illustrated), and controls the movement machine 14, the imaging section 16, and the lighting device 18.

In this embodiment, the movement machine 14 is a vertical articulated robot, and includes a robot base 20, a swiveling body 22, a robot arm 24, a wrist 26, and a robot hand (gripper) 28. The robot base 20 is fixed on a floor of a work cell. The swiveling body 22 is mounted on the robot base 20 so as to be rotatable about a vertical axis.

The robot arm 24 includes an upper arm 30 rotatably coupled to the swiveling body 22 and a forearm 32 rotatably coupled to a distal end of the upper arm 30. The wrist 26 is attached to a distal end of the forearm 32 and rotatably supports the robot hand 28.

Figure 3:
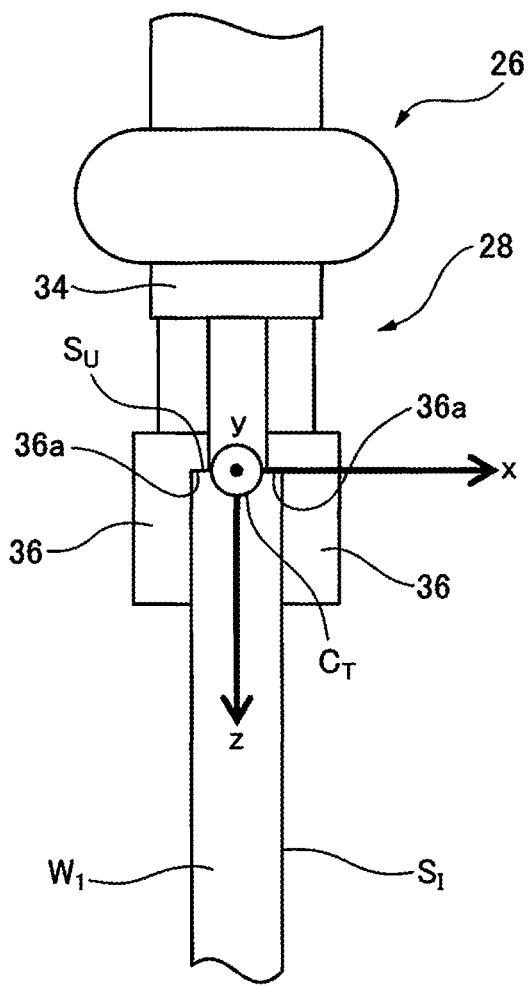
FIG. 3 is an enlarged view of the robot hand illustrated in FIG. 1, the robot hand viewed from the positive side of the y-axis of the tool coordinate system.

As illustrated in FIG. 3, the robot hand 28 includes a hand base 34, a plurality of fingers 36, and a finger driver (not illustrated). The hand base 34 is coupled to the wrist 26. The plurality of fingers 36 are mounted to the hand base 34 so as to open and close.

The plurality of fingers 36 extend from the hand base 34 in a direction, and include stepped portions 36a on surfaces of the figures 36 opposite to each other. When the robot hand 28 grips an object W such as a workpiece, an upper surface $S_U$ of the object W engages the stepped portions 36a. The finger driver is e.g. an air cylinder, and built in the hand base 34. The finger driver opens and closes the fingers 36 in accordance with a command from the controller 12.

Figure 2:
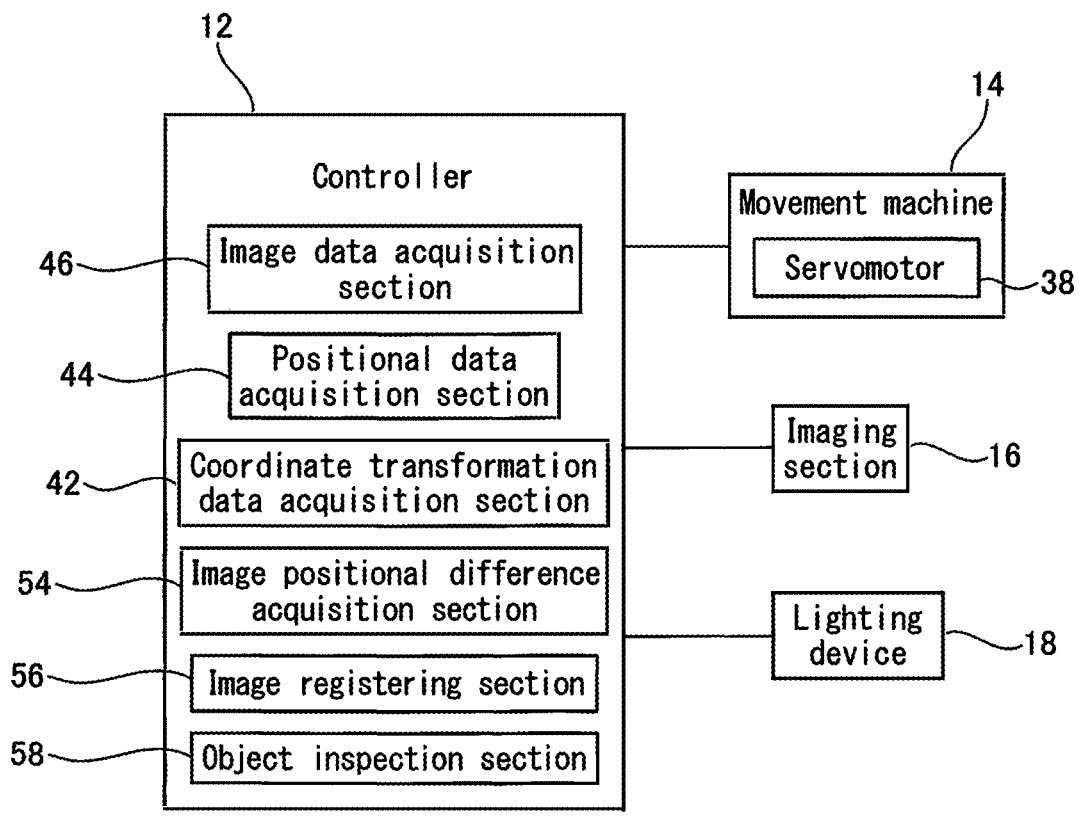
FIG. 2 is a block diagram of the object inspection system.

The movement machine 14 includes a plurality of servomotors 38 (FIG. 2). The servomotors 38 are respectively built in the swiveling body 22, the robot arm 24, and the wrist 26 of the movement machine 14, and drive these components in accordance with commands (speed command, torque command, etc.) from the controller 12.

A robot coordinate system (movement machine coordinate system) $C_R$ (FIG. 1) is set as one of the coordinate systems for automatic control of each component of the movement machine 14. The controller 12 operates each component of the movement machine 14 with reference to the robot coordinate system $C_R$. For example, the z-axis of the robot coordinate system $C_R$ is set to be parallel to the vertical direction in the real space, wherein the swiveling body 22 is rotated about the z-axis of the robot coordinate system $C_R$.

A tool coordinate system $C_T$ is set for the robot hand 28. The tool coordinate system $C_T$ is one of the coordinate systems for automatic control, and the position and orientation of the robot hand 28 in space are determined by expressing the position and direction of the tool coordinate system $C_T$ in the robot coordinate system $C_R$.

As illustrated in FIG. 3, in this embodiment, the tool coordinate system $C_T$ is set such that the origin of the tool coordinate system $C_T$ is positioned between the stepped portions 36a of the fingers 36, the fingers 36 extend from the hand base 34 in the z-axis positive direction of the tool coordinate system $C_T$, and the fingers 36 open and close in the x-axis direction of the tool coordinate system $C_T$.

The controller 12 operates the swiveling body 22, the robot arm 24, and the wrist 26 in the robot coordinate system $C_R$ such that the position and orientation of the robot hand 28 coincide with those determined by the tool coordinate system $C_T$. In this way, the robot hand 28 is disposed at any position and orientation in the robot coordinate system $C_R$.

The imaging section 16 includes an optical system such as a focus lens, and an image sensor such as a CCD sensor or a CMOS sensor. In this embodiment, the imaging section 16 is fixed at a predetermined position in the robot coordinate system $C_R$ so as to be separate away from the movement machine 14. The imaging section 16 images an object W in accordance with a command from the controller 12, and sends the captured image to the controller 12.

The fixation position of the imaging section 16 and the optical axis O of the imaging section 16 (i.e., the optical path of the object image entering the optical system of the imaging section 16) are expressed by coordinates in the robot coordinate system $C_R$ by calibrating them with respect to the robot coordinate system $C_R$, and pre-stored in the storage of the controller 12. Due to this, the controller 12 can recognize the positions of the imaging section 16 and the optical axis O in the robot coordinate system $C_R$.

The lighting device 18 includes e.g. an incandescent lamp, fluorescent lamp, or an LED, and is fixed to a predetermined position. The lighting device 18 switches on and off in accordance with a command from the controller 12, and illuminates the object W gripped by the movement machine 14.

Next, with reference to FIGS. 1 to 11, a function of the object inspection system 10 will be described. In this embodiment, the object inspection system 10 images a surface $S_I$ to be inspected of a first object $W_1$, then images a surface $S_I$ to be inspected of a second object $W_2$, and inspects whether or not there is a visually recognizable error (e.g., a scar, a difference in surface roughness, a difference in attachment positions of parts, a difference in welding positions, etc.) in the second object $W_2$ with respect to the first object $W_1$, by comparing the two images with each other.

The first object $W_1$ and the second object $W_2$ have a common outer shape. In this embodiment, the first object $W_1$ and the second object $W_2$ are rectangular plates having the same outer shape. Each of the first object $W_1$ and the second object $W_2$ includes a total of four holes H.

First, the controller 12 operates the movement machine 14 so as to grip the first object $W_1$ stored in a predetermined storage place by the robot hand 28. At this time, the robot hand 28 grips the first object $W_1$ at a gripping position (target position) designated in advance. This gripping position is determined by a position and direction of the tool coordinate system $C_T$ set by the controller 12 when the robot hand 28 grips the first object $W_1$.

As an example, the operator designates the position of the origin of the tool coordinate system $C_T$ on the first object $W_1$ by operating on an operation section (not illustrated) such as a keyboard or a touch panel provided in the object inspection system 10.

Figure 4:
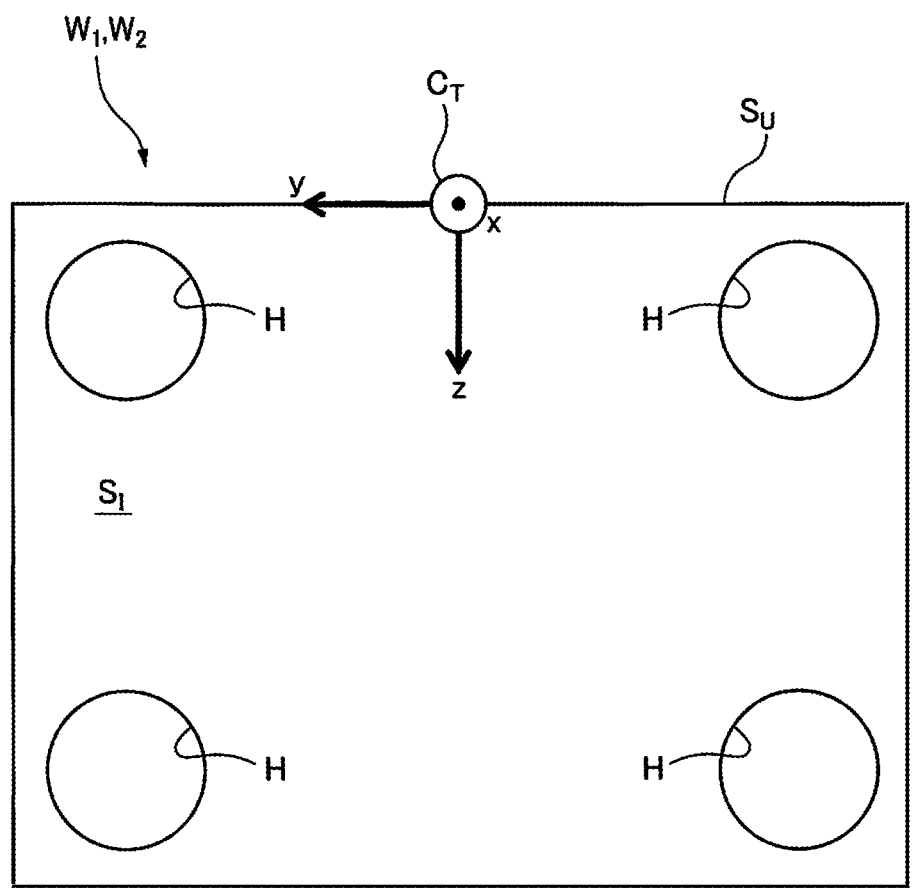
FIG. 4 is a diagram for describing the disposition of the tool coordinate system relative to an object.

Assume that the operator designates the position of the origin of the tool coordinate system $C_T$ at the center of the upper surface $S_U$ of the first object $W_1$ as illustrated in FIG. 4. In this case, when the robot hand 28 grips the first object $W_1$ stored in the storage place, the controller 12 sets the tool coordinate system $C_T$ with respect to the first object $W_1$ such that the origin of the tool coordinate system $C_T$ is positioned at the center of the upper surface $S_U$ of the first object $W_1$ and the y-z plane of the tool coordinate system $C_T$ is parallel to the surface $S_I$ to be inspected.

Figure 5:
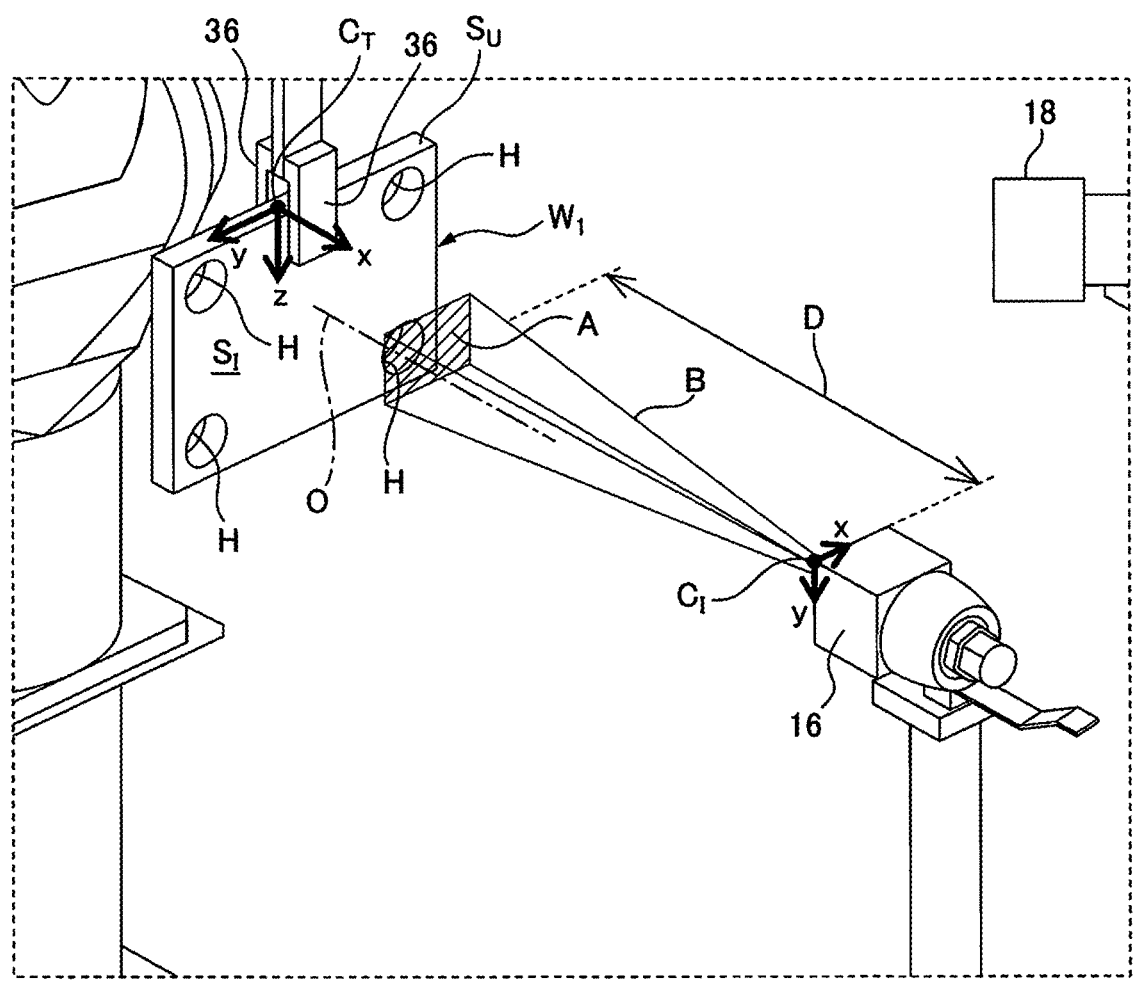
FIG. 5 is an enlarged view of the imaging section and the object illustrated in FIG. 1.

The controller 12 then operates the movement machine 14 so as to dispose the robot hand 28 at the position and orientation defined by the set tool coordinate system $C_T$, and grip the first object $W_1$ by the robot hand 28. As a result, as illustrated in FIGS. 1, 3, and 5, the robot hand 28 grips the first object $W_1$ at the gripping position corresponding to the tool coordinate system $C_T$ designated by the operator.

When the robot hand 28 grips the first object $W_1$ at the designated gripping position, the position of the first object $W_1$ relative to the robot hand 28 (i.e., the tool coordinate system $C_T$) becomes known, and any position on the first object $W_1$ can be expressed by the coordinates in the robot coordinate system $C_R$, using this gripping position and the drawing data of the first object $W_1$.

In other words, the first object $W_1$ gripped by the robot hand 28 at a known gripping position can be regarded as a component of the movement machine 14, which is controlled in the robot coordinate system $C_R$.

Then, the controller 12 operates the movement machine 14 so as to move the first object $W_1$ such that at least a part of the surface $S_I$ of the first object $W_1$ is within a field of view A of the imaging section 16, and dispose the first object $W_1$ and the imaging section 16 at a reference relative position ("reference relative position" corresponding to "first relative position" in the claims).

The field of view A of the imaging section 16 will be described with reference to FIG. 5. The imaging section 16 has a view angle indicative of the range in which the imaging section 16 can image. The view angle depends on the specifications of the optical system and the image sensor of the imaging section 16. More specifically, Longer the focal length of the optical system is (or smaller the light-receiving surface of the image sensor is), narrower the view angle is.

An example of the view angle of the imaging section 16 is illustrated as an imaginary line B in FIGS. 1 and 5. This view angle B and the distance D between the imaging section 16 and the surface $S_I$ determine the range of the surface $S_I$ that can be imaged by the imaging section 16 (i.e., field of view A) when the first object $W_1$ and the imaging section 16 are positioned as illustrated in FIG. 1.

In other words, the field of view A indicates the area on the surface $S_I$ that can be imaged in focus by the imaging section 16 when the imaging section 16 and the surface $S_I$ are disposed separate away from each other by a distance D. The resolution of an image imaged by the imaging section 16 is inversely proportionate to the field of view A. Specifically, smaller the field of view A is, higher the resolution of the captured image is.

After gripping the first object $W_1$ by the robot hand 28 at the gripping position, the controller 12 operates the movement machine 14 so as to dispose the robot hand 28 at a first position and orientation illustrated in FIG. 1.

More specifically, the controller 12 sets the tool coordinate system $C_T$ at a first position and direction (i.e., the position of the origin and the directions of the axes) illustrated in FIG. 1. The controller 12 then operates the movement machine 14 so as to move the robot hand 28 gripping the first object $W_1$ to coincide with the position and orientation defined by the tool coordinate system $C_T$ illustrated in FIG. 1.

As a result, the robot hand 28 is disposed at the first position and orientation, and the first object $W_1$ gripped by the robot hand 28 is positioned at the first reference relative position with respect to the imaging section 16 as illustrated in FIG. 1.

Figure 6:
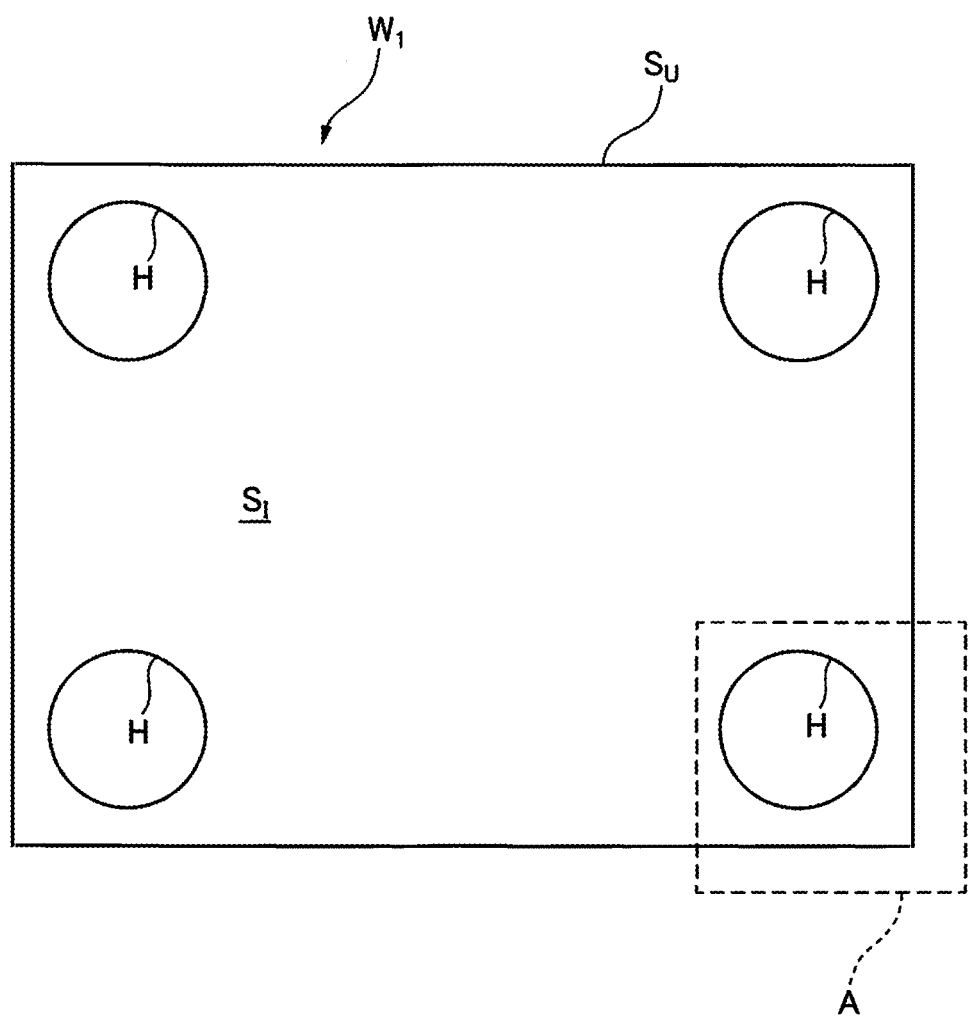
FIG. 6 is a diagram illustrating a field of view over the surface to be inspected when a first object and an imaging section are positioned at a first reference relative position.

At this time, the field of view A of the imaging section 16 is disposed at the position illustrated in FIGS. 1, 5, and 6 with respect to the surface $S_I$ of the first object $W_1$, wherein the optical axis O of the imaging section 16 is perpendicular to the surface $S_I$ of the first object $W_1$ and the imaging section 16 and the surface $S_I$ are separate away from each other by the distance D.

Then, the controller 12 sends a command to the lighting device 18 so as to switch on the lighting device 18. Whereby, the first object $W_1$ gripped by the movement machine 14 is illuminated by the lighting device 18.

Figure 7:
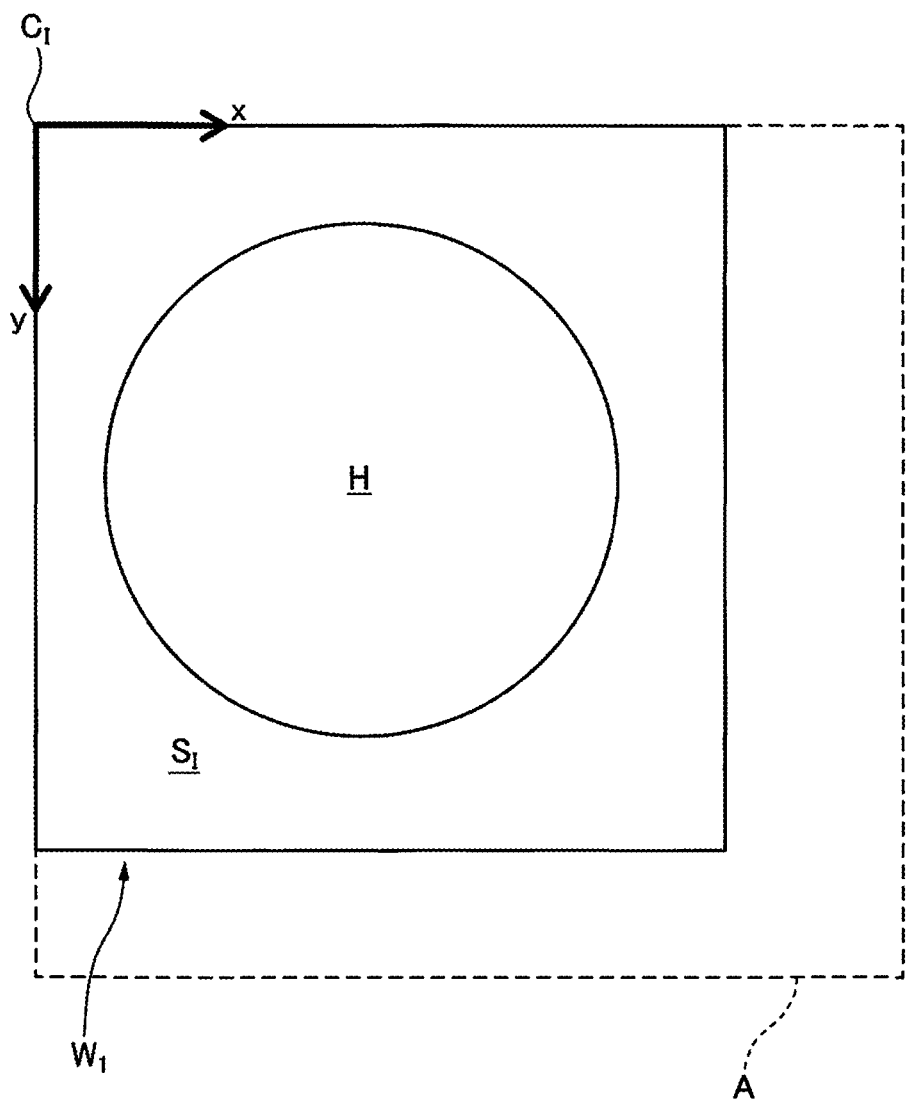
FIG. 7 illustrates an example of a master image imaged by the imaging section when the first object and the imaging section are positioned at the first reference relative position.

Then, the controller 12 sends an imaging command to the imaging section 16. Upon receiving the imaging command from the controller 12, the imaging section 16 images the surface $S_I$ of the first object $W_1$. FIG. 7 shows an example of an image ("first image", referred to as "master image" hereinafter) of the first object $W_1$ imaged by the imaging section 16 when the first object $W_1$ and the imaging section 16 are positioned at the first reference relative position.

The first master image 40 illustrated in FIG. 7 is an image within the field of view A of the imaging section 16 when the first object $W_1$ and the imaging section 16 are positioned at the first reference relative position (i.e., when the robot hand 28 gripping the first object $W_1$ is disposed at the first position and orientation).

Each pixel of the first master image 40 imaged by the imaging section 16 is expressed by coordinates in the image coordinate system $C_I$ in FIG. 7. The image coordinate system $C_I$ is a coordinate system which defines the field of view A of the imaging section 16, and each pixel of the first master image 40 imaged by the imaging section 16 is expressed by coordinates in the image coordinate system $C_I$.

The positional relation between the robot coordinate system $C_R$ and the image coordinate system $C_I$ (i.e., the position of the origin and the axis-directions of the image coordinate system $C_I$ with respect to the robot coordinate system $C_R$) is known by the above-described calibration.

More specifically, the operator acquires the coordinate transformation data between the robot coordinate system $C_R$ and the image coordinate system $C_I$ by calibrating the fixation position and the position of the optical axis O of the imaging section 16 with respect to the robot coordinate system $C_R$. The coordinate transformation data is represented by e.g. a Jacobian matrix for transforming coordinates in the robot coordinate system $C_R$ into coordinates in the image coordinate system $C_I$.

The controller 12 acquires the coordinate transformation data, and stores it in the storage. Thus, in this embodiment, the controller 12 functions as a coordinate transformation data acquisition section 42 (FIG. 2) configured to acquire the coordinate transformation data.

The controller 12 acquires the positional data of the movement machine 14 when the first object $W_1$ and the imaging section 16 are disposed at the first reference relative position and the imaging section 16 images the first object $W_1$ (first positional data, referred to as "reference positional data" hereinafter).

For example, the controller 12 acquires, as a first reference positional data, information of the position and direction of the tool coordinate system $C_T$ in the robot coordinate system $C_R$ when the first object $W_1$ and the imaging section 16 are disposed at the first reference relative position.

Alternatively, the controller 12 records the rotation angles of the servomotors 38 of the movement machine 14 when the first object $W_1$ and the imaging section 16 are disposed at the first reference relative position, and calculates the position and orientation of the robot hand 28 in the robot coordinate system $C_R$ from the calculated rotation angles. The controller 12 may acquire the calculated position and orientation of the robot hand 28 as the first reference positional data.

The first reference positional data are information corresponding to the position and orientation of the first object $W_1$ in the robot coordinate system $C_R$ when the first object $W_1$ and the imaging section 16 are disposed at the first reference relative position. Thus, in this embodiment, the controller 12 functions as a positional data acquisition section 44 (FIG. 2) configured to acquire the reference positional data (first positional data).

Then, the controller 12 operates the movement machine 14 so as to dispose the robot hand 28 gripping the first object $W_1$ at a second position and orientation. When the robot hand 28 is disposed at the second position and orientation, the first object $W_1$ gripped by the robot hand 28 is disposed at a second reference relative position with respect to the imaging section 16. At this time, the field of view A of the imaging section 16 is disposed at an area $A_2$ with respect to the surface $S_I$ of the first object $W_1$ as illustrated in FIG. 8.

When the first object $W_1$ and the imaging section 16 are positioned at the second reference relative position (i.e., the robot hand 28 is disposed at the second position and orientation), the controller 12 sends an imaging command to the imaging section 16 so as to image an image the surface $S_I$ of the first object $W_1$. As a result, a second master image corresponding to the area $A_2$ in FIG. 8 is captured.

Figure 8:
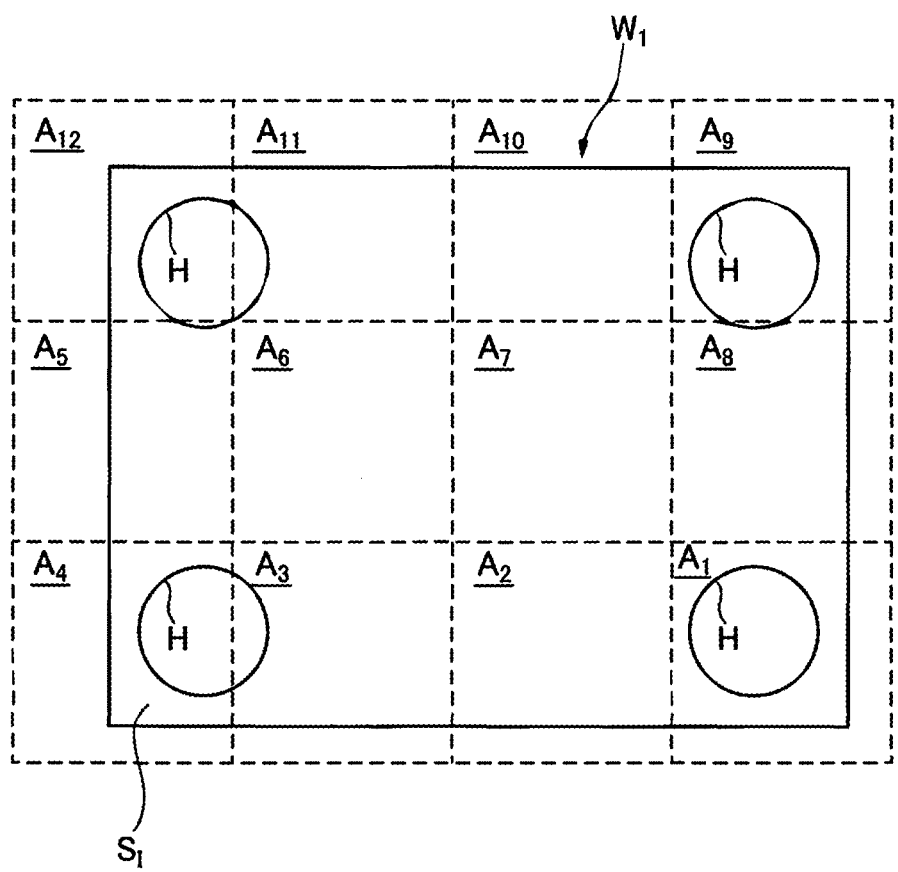
FIG. 8 is a diagram illustrating the fields of view over the surface to be inspected when the first object and the imaging section are disposed at the nth reference relative position (n=1 to 12).

The area $A_n$ (n=1 to 12) in FIG. 8 indicates the position of the field of view A of the imaging section 16 with respect to the surface $S_I$ when the robot hand 28 gripping the first object $W_1$ is disposed at the n-th position and orientation and whereby the first object $W_1$ is disposed at the n-th reference relative position with respect to the imaging section 16.

As illustrated in FIG. 8, the area $A_n$ and the area $A_{n+1}$ are adjacent to each other such that sides of the areas $A_n$ and $A_{n+1}$ coincide with each other. Note that, the n-th reference relative position of the first object $W_1$ relative to the imaging section 16 may be defined such that two adjacent areas $A_n$ are at least partially overlapping each other.

When the robot hand 28 is disposed at the n-th position and orientation, the controller 12 sets the tool coordinate system $C_T$ at the n-th position and direction. The controller 12 then operates the movement machine 14 and moves the robot hand 28 so as to coincide with the position and orientation defined by the tool coordinate system $C_T$ disposed at the n-th position and direction.

In this way, the controller 12 sequentially disposes the robot hand 28 at the third position and orientation, the fourth position and orientation, . . . the n-th position and orientation, whereby, sequentially positions the first object $W_1$ gripped by the robot hand 28 at the third reference relative position, the fourth reference relative position, . . . the n-th reference relative position with respect to the imaging section 16.

The controller 12 causes the imaging section 16 to image the surface $S_I$ of the first object $W_1$ each time the first object $W_1$ and the imaging section 16 are positioned at the respective reference relative positions. As a result, the controller 12 acquires the first to the twelfth master images that correspond to the areas $A_1$ to $A_{12}$ in FIG. 8. Thus, in this embodiment, the controller 12 functions as an image data acquisition section 46 (FIG. 2) configured to acquire the n-th master image.

Further, the controller 12 functions as the positional data acquisition section 44 and acquires, as the n-th reference positional data, the position of the movement machine 14 when the first object $W_1$ and the imaging section 16 are disposed at the n-th reference relative position and the n-th master image is captured.

The controller 12 carries out a series of positioning operations as described above, in accordance with a robot program. The robot program can be constructed e.g. by the operator teaching to the actual movement machine 14 the motions of disposing the robot hand 28 at the n-th position and orientation using a teach pendant (not illustrated).

The robot program includes information of the n-th position and direction of the tool coordinate system $C_T$ and information of the rotation angles of the servomotors 38 of the movement machine 14 when disposing the robot hand 28 at the n-th position and orientation.

Then, the controller 12 acquires an inspection image (second image) of a surface $S_I$ to be inspected of a second object $W_2$. More specifically, the controller 12 operates the movement machine 14 so as to grip the second object $W_2$ stored in a predetermined storage place by the robot hand 28.

At this time, the robot hand 28 grips the second object $W_2$ at the same gripping position as that designated for the first object $W_1$. Specifically, when the robot hand 28 grips the second object $W_2$, as illustrated in FIG. 4, the tool coordinate system $C_T$ is set with respect to the second object $W_2$ such that the origin of the tool coordinate system $C_T$ is positioned at the center of the upper surface $S_U$ of the second object $W_2$ and the y-z plane of the tool coordinate system $C_T$ is parallel to the surface $S_I$ of the second object $W_2$.

The controller 12 then operates the movement machine 14 so as to dispose the robot hand 28 at the position and orientation defined by the set tool coordinate system $C_T$, and grip the second object $W_2$ by the robot hand 28. In this way, the robot hand 28 grips the second object $W_2$ at the same gripping position as that for the first object $W_1$.

Then, the controller 12 operates the movement machine 14 so as to dispose the second object $W_2$ gripped by the robot hand 28 at a first inspection relative position ("inspection relative position" corresponding to "second relative position" in the claims) with respect to the imaging section 16. The first inspection relative position is a position corresponding to the first reference relative position. Then, the controller 12 sends an imaging command to the imaging section 16 so as to image the surface $S_f$ of the second object $W_2$, and acquires an inspection image (second image).

In this respect, a displacement may occur between the first reference relative position and the first inspection relative position. Such a displacement can occur when the controller 12 causes the imaging section 16 to image the second object $W_2$ while moving the second object $W_2$ by the movement machine 14. Alternatively, such a displacement can occur when the position and orientation of the movement machine 14 is slightly adjusted upon imaging the second object $W_2$.

FIGS. 9 to 12 illustrate examples of the first inspection image of the second object $W_2$ imaged by the imaging section 16 at the first inspection relative position in a state where such a displacement occurs. Note that, in FIGS. 9 to 12, the image of the first object $W_1$ in the first master image 40 when the first inspection image and the first master image 40 are superimposed with reference to the image coordinate system $C_I$ (i.e., the field of view A) is indicated by chain line.

Figure 9:
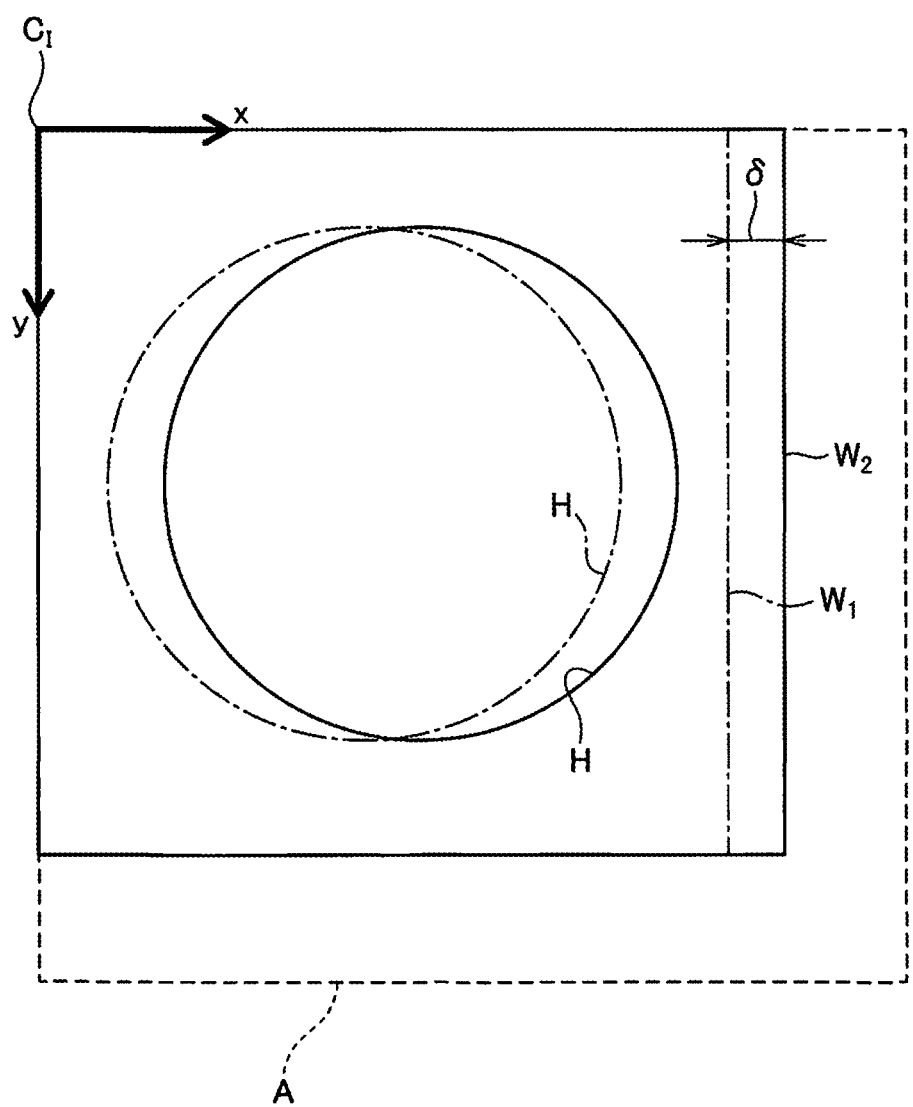
FIG. 9 illustrates an example of an inspection image imaged by the imaging section when a second object and the imaging section are disposed at a first inspection relative position.

In the first inspection image 48 illustrated in FIG. 9, the image of the second object $W_2$ of the first inspection image 48 is displaced relative to the image of the first object $W_1$ of the first master image 40 in the x-axis positive direction of the image coordinate system $C_I$ by a positional difference $\delta$.

Such a positional difference $\delta$ occurs when the second object $W_2$ disposed at the first inspection relative position is displaced from the first object $W_1$ disposed at the first reference relative position in the x-axis positive direction of the image coordinate system $C_I$.

Figure 10:
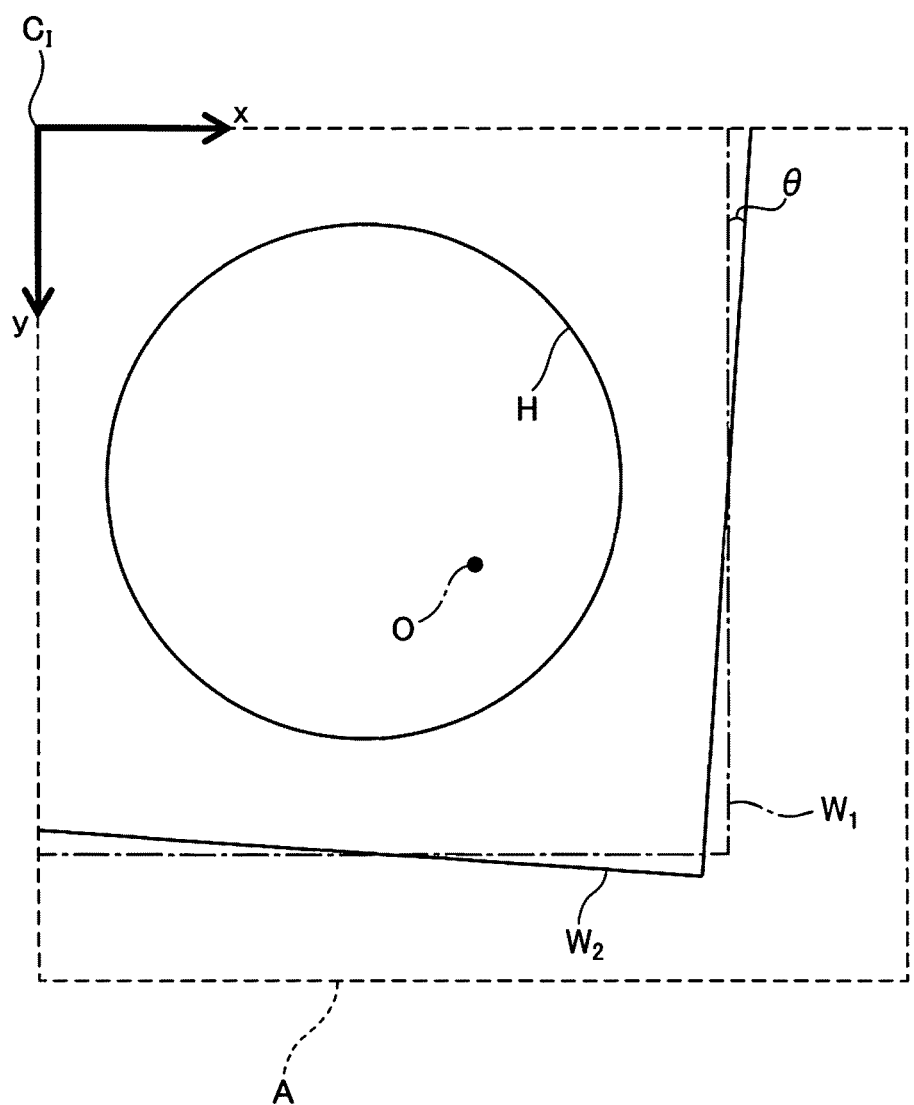
FIG. 10 illustrates an example of an inspection image imaged by the imaging section when the second object and the imaging section are disposed at the first inspection relative position.

In the first inspection image 50 illustrated in FIG. 10, the image of the second object $W_2$ in the first inspection image 50 is rotated relative to the image of the first object $W_1$ in the first master image 40 about the optical axis O of the imaging section 16 by a positional difference $\theta$.

Such a positional difference $\theta$ occurs when the second object $W_2$ disposed at the first inspection relative position is displaced from the first object $W_1$ disposed at the first reference relative position in the rotational direction about the optical axis O of the imaging section.

Figure 11:
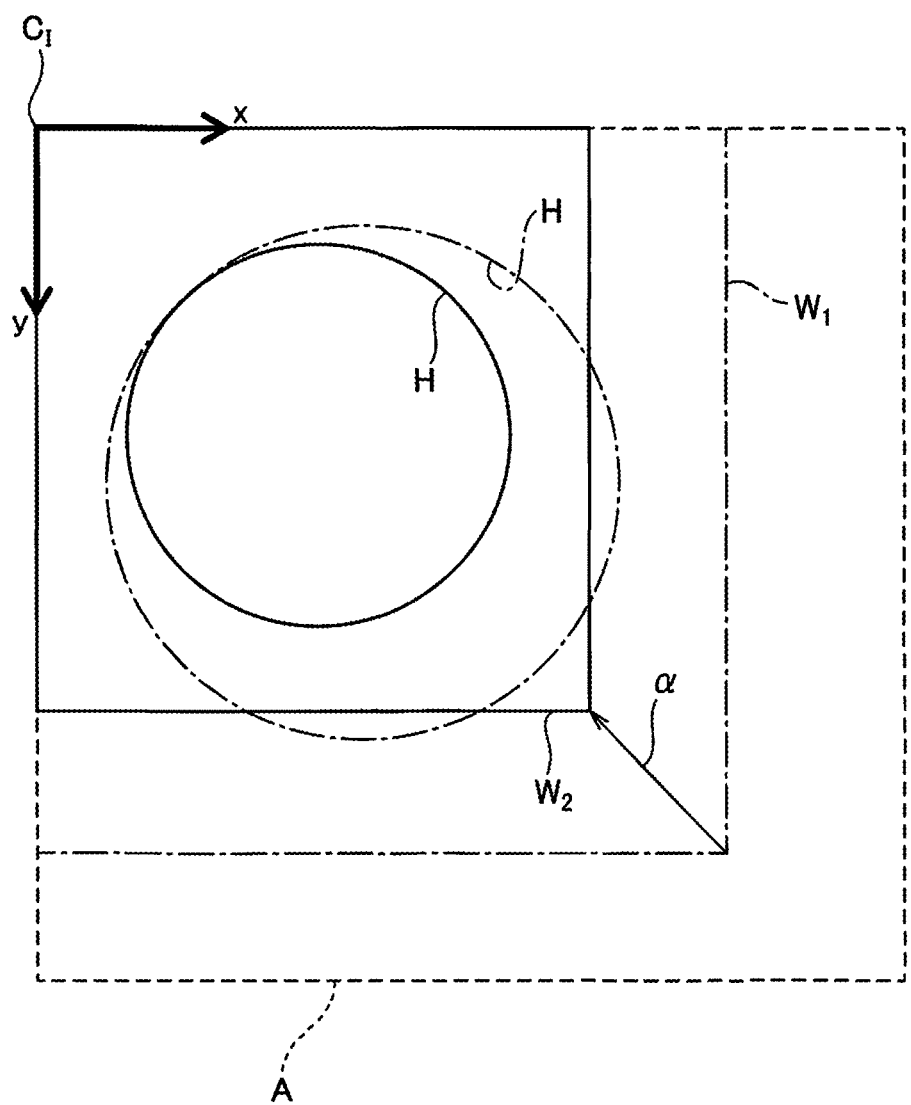
FIG. 11 illustrates an example of an inspection image imaged by the imaging section when the second object and the imaging section are disposed at the first inspection relative position.

Further, in the first inspection image 52 illustrated in FIG. 11, the image of the second object $W_2$ in the first inspection image 52 is reduced relative to the image of the first object $W_1$ in the first master image 40 by a positional difference $\alpha$.

Such a positional difference $\alpha$ occurs when the second object $W_2$ disposed at the first inspection relative position is displaced from the first object $W_1$ disposed at the first reference relative position in the direction along the optical axis O of the imaging section (more specifically, displaced more separate away from).

When this positional difference $\alpha$ occurs, the distance $D_1$ between the surface $S_f$ of the first object $W_1$ disposed at the first reference relative position and the imaging section 16 is different from the distance $D_2$ between the surface $S_f$ of the second object $W_2$ disposed at the first inspection relative position and the imaging section 16 (more specifically, $D_1 < D_2$). The positional difference $\alpha$ represents the reduction rate of the first inspection image 52 to the first master image 40.

Figure 12:
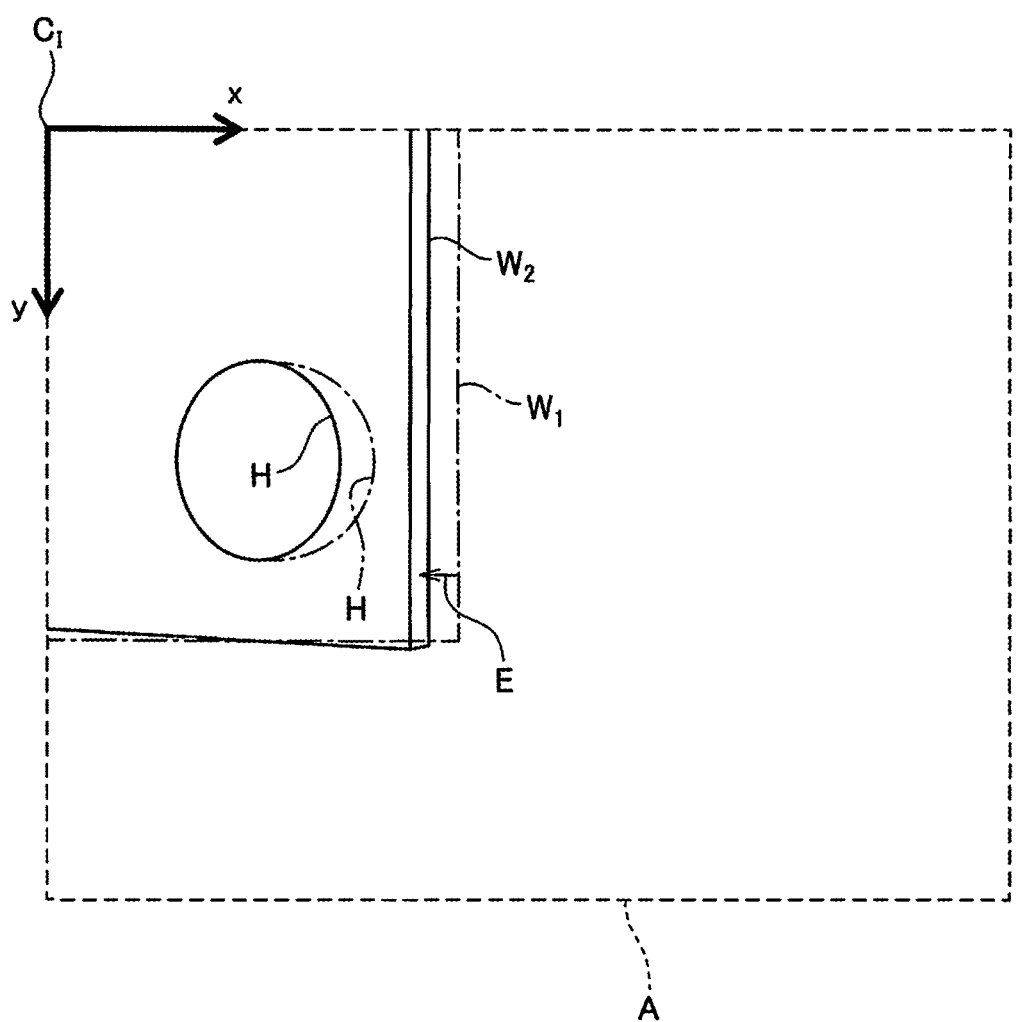
FIG. 12 illustrates an example of an inspection image imaged by the imaging section when the second object and the imaging section are disposed at the first inspection relative position.

In the first inspection image 53 illustrated in FIG. 12, the image of the second object $W_2$ in the first inspection image 53 is displaced relative to the image of the first object $W_1$ in the first master image 40 as indicated by the arrow E.

This first inspection image 53 is described with reference to FIG. 13. Section (a) in FIG. 13 illustrates the positional relation between the first object $W_1$ and the imaging section 18 upon imaging the first master image 40, while section (b) in FIG. 13 illustrates the positional relation between the second object $W_2$ and the imaging section 18 upon imaging the first inspection image 53.

As described above, the first object $W_1$ is positioned at the first reference relative position with respect to the imaging section 16 when the first master image 40 is captured. As illustrated in section (a) in FIG. 13, at the first reference relative position, the optical axis O of the imaging section 16 is perpendicular to the surface $S_f$ of the first object $W_1$, and the imaging section 16 is separate from the surface $S_f$ by the distance $D_1$.

On the other hand, as illustrated in section (b) in FIG. 13, the surface $S_f$ of the second object $W_2$ (i.e., the y-z plane of the tool coordinate system $C_T$) is inclined relative to the optical axis O of the imaging section 16 when the first inspection image 53 is captured.

Due to this inclination, the image of the second object $W_2$ in the first inspection image 53 is displaced from the image of the first object $W_1$ in the first master image 40 as indicated by the arrow E. The positional difference between the image of the second object $W_2$ in the first inspection image 53 and the image of the first object $W_1$ in the first master image 40 due to such an inclination can be expressed by a matrix M (e.g., a homography matrix) described later.

If the above-mentioned displacement occurs, it is necessary to register the master image and the inspection image with each other when comparing the master image and the inspection image in order to inspect the surface $S_f$ of the second object $W_2$. The object inspection system 10 according to this embodiment calculates the positional difference $\delta$, $\theta$, $\alpha$, M, and registers the master image and the inspection image on the basis of the positional difference $\delta$, $\theta$, $\alpha$, M.

Herein, "to register" (or "registering") means to cause the image of the first object $W_1$ in the master image and the image of the second object $W_2$ in the inspection image to coincide with each other (i.e., position alignment) in the image coordinate system $C_I$.

More specifically, the controller 12 functions as the positional data acquisition section 44, and acquires the positional data of the movement machine 14 (second positional data, referred to as "inspection positional data" hereinafter) when the movement machine 14 disposes the second object $W_2$ and the imaging section 16 at the first inspection relative position and the first inspection image 48, 50, 52 is captured by the imaging section 16.

For example, the controller 12 acquires, as the first inspection positional data, information of the position and direction of the tool coordinate system $C_T$ in the robot coordinate system $C_R$ when the second object $W_2$ and the imaging section 16 are disposed at the first inspection relative position.

Alternatively, the controller 12 records the rotation angles of the servomotors 38 of the movement machine 14 when the second object $W_2$ and the imaging section 16 are disposed at the first inspection relative position, and calculates the position and orientation of the robot hand 28 in the robot coordinate system $C_R$ from the rotation angles. The controller 12 may acquire the calculated position and orientation of the robot hand 28 as the first inspection positional data.

The first inspection positional data are the data corresponding to the position and orientation of the second object $W_2$ in the robot coordinate system $C_R$ when the second object $W_2$ and the imaging section 16 are disposed at the first inspection relative position.

Similarly, the controller 12 operates the movement machine 14 so as to position the second object $W_2$ gripped by the robot hand 28 at the n-th inspection relative position (n=2 to 12) with respect to the imaging section 16. The n-th inspection relative position corresponds to the n-th reference relative position.

The controller 12 causes the imaging section 16 to image the surface $S_I$ of the second object $W_2$ each time the second object $W_2$ and the imaging section 16 are positioned at the n-th inspection relative position, and acquires the n-th inspection image. Then, the controller 12 functions as the positional data acquisition section 44 to acquires, as the n-th inspection positional data, the positional data of the movement machine 14 when the second object $W_2$ and the imaging section 16 are positioned at the n-th inspection relative position.

Subsequently, the controller 12 calculates the first positional difference (e.g., $\delta$, $\theta$, or $\alpha$) on the basis of the positional relation between the robot coordinate system $C_R$ and the image coordinate system $C_I$, the first reference positional data, and the first inspection positional data.

As an example, regarding the above-described positional difference $\delta$ or $\theta$, the controller 12 acquires the coordinates in the robot coordinate system $C_R$ of the position and direction of the tool coordinate system $C_T$ included in the first reference positional data, and the coordinates in the robot coordinate system $C_R$ of the position and direction of the tool coordinate system $C_T$ included in the first inspection positional data, and calculates the difference $\Delta_{R1}$ between these two sets of coordinates.

The controller 12 then transforms the difference $\Delta_{R1}$, which is expressed as the coordinates in the robot coordinate system $C_R$, into coordinates in the image coordinate system $C_I$, using the coordinate transformation data obtained by calibration. Thus, the positional difference $\delta$ or $\theta$ in the image coordinate system $C_I$ is calculated.

Further, regarding the above-described positional difference $\alpha$, the controller 12 calculates the above-described distances $D_1$ and $D_2$ from the coordinates in the robot coordinate system $C_R$ of the position of the tool coordinate system $C_T$ included in the first reference positional data, and the coordinates in the robot coordinate system $C_R$ of the position of the tool coordinate system $C_T$ included in the first inspection positional data.

The controller 12 then calculates the positional difference $\alpha$ representing the reduction rate (or the enlargement rate) of the first inspection image 52 to the first master image 40, based on the calculated ratio between $D_1$ and $D_2$. The ratio between $D_1$ and $D_2$ correlates to the reduction rate a (or the enlargement rate $\alpha$) of the first master image 40 to the first inspection image 52.

Using the similar method, the controller 12 calculates the n-th positional difference between the image of the first object $W_1$ in the n-th master image and the image of the second object $W_2$ in the n-th inspection image (n=2 to 12). Thus, in this embodiment, the controller 12 functions as an image positional difference acquisition section 54 (FIG. 2)

configured to acquire the positional difference (e.g., $\delta$, $\theta$, $\alpha$) between the master image (first image) and the inspection image (second image) in the image coordinate system $C_I$. An example of acquiring the above-described matrix M as a positional difference will be described later.

Subsequently, the controller 12 shifts the first master image 40 or the first inspection image 48, 50, 52 on the basis of the calculated first positional difference ($\delta$, $\theta$, $\alpha$) so as to register these two images.

For example, if the controller 12 calculates the first positional difference $\delta$, the controller 12 moves the first inspection image 48 (or the first master image 40) in the x-axis negative direction (or the x-axis positive direction) of the image coordinate system $C_I$ on the x-y plane of the image coordinate system $C_I$ by the first positional difference $\delta$.

If the controller 12 calculates the first positional difference $\theta$, the controller 12 rotates the first inspection image 50 (or the first master image 40) counterclockwise (or clockwise) as viewed from the front of FIG. 10 about the optical axis O perpendicular to the x-y plane of the image coordinate system $C_I$ by the first positional difference $\theta$.

If the controller 12 calculates the first positional difference $\alpha$, the controller 12 enlarges (or reduces) the first inspection image 48 (or the first master image 40) on the basis of the first positional difference $\alpha$.

As a result, the image of the first object $W_1$ in the first master image 40 and the image of the second object $W_2$ in the inspection image 48 can be coincided with each other in the image coordinate system $C_I$. Thus, in this embodiment, the controller 12 functions as an image registering section 56 (FIG. 2) configured to register the master image (first image) and the inspection image (second image) in the image coordinate system $C_I$. Note that, an example in which the image registering section 56 registers the master image (40) and the inspection image (53) on the basis of a positional difference represented by a matrix M will be described later.

Then, the controller 12 shifts the n-th master image or the n-th inspection image on the basis of the n-th positional difference, and sequentially registers these two images, similarly.

Then, the controller 12 inspects whether or not there is any visually recognizable error in the second object $W_2$ with respect to the first object $W_1$, using the n-th master image (40) and the n-th inspection image (48, 50, 52) registered with each other. More specifically, the controller 12 generates the n-th differential image between the n-th master image and the n-th inspection image registered with each other.

The n-th differential image represents e.g. the difference between the luminance of each pixel of the n-th master image and the luminance of each pixel of the n-th inspection image. By analyzing the n-th differential image, the controller 12 can inspect whether or not there is an error (a scar, difference in surface roughness, etc.) on the surface $S_I$ of the second object $W_2$ with respect to the surface $S_I$ of the first object $W_1$.

Thus, in this embodiment, the controller 12 functions as an object inspection section 58 (FIG. 2) configured to inspect whether or not there is an error in the second object $W_2$ with respect to the first object $W_1$.

Figure 14:
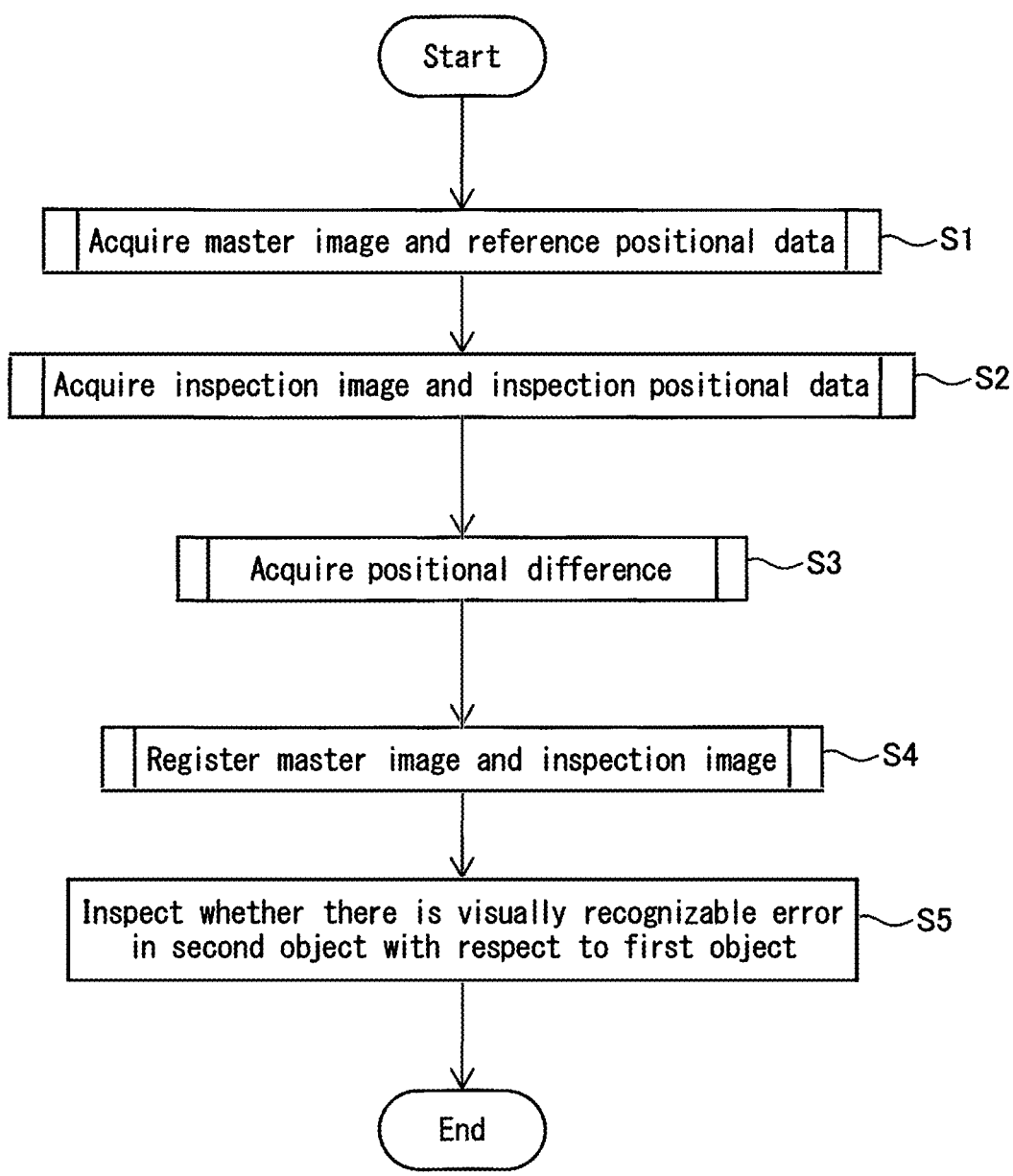
FIG. 14 is a flow chart illustrating an example of the operation process of the object inspection system.

Next, with reference to FIGS. 14 to 18, an example of the operation flow of the object inspection system 10 will be described. The flow illustrated in FIG. 14 is started when the controller 12 receives an inspection execution command from the operator or host controller.

In step S1, the controller 12 acquires a master image (first image) and reference positional data (first positional data).

This step S1 will be described with reference to FIG. 15. In step S11, the controller 12 sets the number "n" to "1", wherein the number "n" is for specifying the n-th master image, the n-th inspection image, the n-th reference positional data, the n-th inspection positional data, the n-th reference relative position, the n-th inspection relative position, and the n-th positional difference.

In step S12, the controller 12 acquires the n-th master image. Specifically, the controller 12 operates the movement machine 14 so as to dispose the first object $W_1$ gripped by the robot hand 28 at the n-th reference relative position with respect to the imaging section 16, by the above-mentioned method.

The controller 12 then causes the imaging section 16 to image the surface $S_I$ of the first object $W_1$ and acquires the n-th master image. If the number "n" is set as n=1 at the start of this step S12, the controller 12 acquires the first master image 40 illustrated in FIG. 7.

In step S13, the controller 12 acquires the n-th reference positional data. More specifically, the controller 12 acquires, as the n-th reference positional data, the positional data of the movement machine 14 when the first object $W_1$ and the imaging section 16 are disposed at the n-th reference relative position, by the above-mentioned method.

In step S14, the controller 12 increments the number "n" by "1" (i.e., n=n+1).

In step S15, the controller 12 determines whether or not the number "n" is greater than "12". This number "12" corresponds to the number of areas $A_1$ to $A_{12}$ illustrated in FIG. 8 (i.e., the number of times the master image and the inspection image are to be acquired), and determined by the operator. When the controller 12 determines that the number "n" is greater than "12" (i.e., determines YES), the controller 12 proceeds to step S2 in FIG. 14.

On the other hand, when the controller 12 determines that the number "n" is not greater than "12" (i.e., determines NO), the controller 12 returns to step S12. Thus, the controller 12 carries out the loop of steps S12 to S15 until it determines YES in step S15.

With reference to FIG. 14 again, in step S2, the controller 12 acquires the inspection image (second image) and the inspection positional data (second positional data). The process in step S2 will be described with respect to FIG. 16. In step S21, the controller 12 sets the number "n" to "1".

In step S22, the controller 12 acquires the n-th inspection image. More specifically, the controller 12 operates the movement machine 14 so as to move the second object $W_2$ gripped by the robot hand 28 with respect to the imaging section 16, and disposes the second object $W_2$ and the imaging section 16 at the n-th inspection relative position, by the above-mentioned method.

The controller 12 then causes the imaging section 16 to image the surface $S_I$ of the second object $W_2$ and acquires the n-th inspection image. At this time, the controller 12 may cause the imaging section 16 to image the second object $W_2$ while moving the second object $W_2$ with the movement machine 14. In such a case, the relative position of the second object $W_2$ relative to the imaging section 16 at a time when the second object $W_2$ is imaged by the imaging section 16 is the n-th inspection relative position.

If the number "n" is set as n=1 at the start of step S22, the controller 12 acquires the first inspection image 48, 50, or 52 illustrated in FIG. 9, 10, or 11.

In step S23, the controller 12 acquires the n-th inspection positional data. More specifically, the controller 12 acquires, as the n-th inspection positional data, the positional data of the movement machine 14 when the second object $W_2$ and the imaging section 16 are disposed at the n-th inspection relative position, by the above-mentioned method.

In step S24, the controller 12 increments the number "n" by "1" (i.e., n=n+1).

In step S25, the controller 12 determines whether or not the number "n" is greater than "12". When the controller 12 determines that the number "n" is greater than "12" (i.e., determines YES), the controller 12 proceeds to step S3 in FIG. 14.

When the controller 12 determines that the number "n" is not greater than "12" (i.e., determines NO), the controller 12 returns to step S22. Thus, the controller 12 carries out the loop of steps S22 to S25 until it determines YES in step S25.

With reference to FIG. 14 again, in step S3, the controller 12 acquires the positional difference between the master image and the inspection image in the image coordinate system $C_I$. This step S3 will be described with reference to FIG. 17. In step S31, the controller 12 sets the number "n" to "1".

In step S32, the controller 12 determines whether or not there is a difference between the n-th reference relative position and the n-th inspection relative position. More specifically, the controller 12 reads out the n-th reference positional data (e.g., the position coordinates of the tool coordinate system $C_T$ in the robot coordinate system $C_R$) and the n-th inspection positional data, and determines whether or not the difference $\Delta_2$ between them is equal to or more than a predetermined threshold value $\beta$.

When $\Delta_2 \geq \beta$ is satisfied, the controller 12 determines YES, and proceeds to step S33. When $\Delta_2 < \beta$, the controller 12 determines NO, and proceeds to step S34.

In step S33, the controller 12 acquires the n-th positional difference. When the number "n" is set as n=1 at the start of step S33, the controller 12 acquires the first positional difference $\delta$, $\theta$, or $\alpha$ between the first master image 40 and the first inspection image 48, 50, or 52 in the image coordinate system $C_I$, by the above-mentioned method.

In step S34, the controller 12 increments the number "n" by "1" (i.e., n=n+1).

In step S35, the controller 12 determines whether or not the number "n" is greater than "12". When the controller 12 determines that the number "n" is greater than "12" (i.e., determines YES), the controller 12 proceeds to step S4 in FIG. 14.

When the controller 12 determines that the number "n" is not greater than "12" (i.e., determines NO), the controller 12 returns to step S32. Thus, the controller 12 carries out the loop of steps S32 to S35 until it determines YES in step S35.

With reference to FIG. 14 again, in step S4, the controller 12 registers the master image and the inspection image with each other. This step S4 will be described with reference to FIG. 18. In step S41, the controller 12 sets the number "n" to "1".

In step S42, the controller 12 determines whether or not the controller 12 has acquired the n-th positional difference in the above-described step S33. When the number "n" is set as n=1 at the start of step S42, the controller 12 determines whether or not the controller 12 has acquired the first positional difference (e.g., $\delta$, $\theta$, or $\alpha$).

When the controller 12 determines that the controller 12 has acquired the n-th positional difference (i.e., determines YES), the controller 12 proceeds to step S43. When the controller 12 determines that the controller 12 has not acquired the n-th positional difference (i.e., determines NO), the controller 12 proceeds to step S44.

In step S43, the controller 12 registers the n-th master image and the n-th inspection image. When the number "n"

is set as n=1 at the start of step S43, the controller 12 shifts the first master image 40 or the first inspection image 48, 50, or 52 so as to register these two images, on the basis of the first positional difference (δ, θ, α), by the above-mentioned method.

As a result, the image of the first object $W_1$ in the first master image 40 and the image of the second object $W_2$ in the inspection image 48 can be coincided with each other in the image coordinate system $C_I$.

On the other hand, when the controller 12 determines NO in step S42, in step S44, the controller 12 superimposes the n-th master image on the n-th inspection image with reference to the image coordinate system $C_I$. There is no n-th positional difference between these n-th master image and the n-th inspection image, i.e., the n-th reference relative position is the same as the n-th inspection relative position.

Therefore, by simply superimposing the n-th master image on the n-th inspection image with reference to the image coordinate system $C_I$, the image of the first object $W_1$ in the first master image 40 and the image of the second object $W_2$ in the inspection image 48 are coincided with each other in the image coordinate system $C_I$.

In step S45, the controller 12 increments the number "n" by "1" (i.e., n=n+1).

In step S46, the controller 12 determines whether or not the number "n" is greater than "12". When the controller 12 determines that the number "n" is greater than "12" (i.e., determines YES), the controller 12 proceeds to step S5 in FIG. 14.

When the controller 12 determines that the number "n" is not greater than "12" (i.e., determines NO), the controller 12 returns to step S42. Thus, the controller 12 carries out the loop of steps S42 to S46 until it determines YES in step S46.

With reference to FIG. 14 again, in step S5, the controller 12 functions as the object inspection section 58 (FIG. 2) to inspect whether or not there is any visually recognizable error in the second object $W_2$ with respect to the first object $W_1$. More specifically, the controller 12 generates the n-th differential image between the n-th master image and the n-th inspection image, which have been registered in step S43 or which have been superimposed in step S44.

The controller 12 analyzes the n-th differential image and inspects whether or not there is any error on the surface $S_I$ of the second object $W_2$ with respect to the surface $S_I$ of the first object $W_1$. By executing these operations from n=1 to n=12, it is possible to inspect all area in the surface $S_I$ of the second object $W_2$.

As described above, in this embodiment, the controller 12 registers the n-th master image and the n-th inspection image with each other in the image coordinate system $C_I$, using the known positional relation (coordinate transformation data) between the robot coordinate system $C_R$ and the image coordinate system $C_I$, the n-th reference positional data, and the n-th inspection positional data.

According to this configuration, if there is a displacement between the master image and the inspection image, it is possible to register these two images with each other using the positional data of the movement machine 14. Whereby, it is possible to facilitate and expedite the work necessary for registering.

Further, in this embodiment, the controller 12 acquires the coordinate transformation data indicating the positional relation between the robot coordinate system $C_R$ and the image coordinate system $C_I$. According to this configuration, the coordinates in the robot coordinate system $C_R$ can be transformed into those in the image coordinate system $C_I$, and it is possible to accurately register the master image and the inspection image with each other, using the positional data of the movement machine 14.

Further, in this embodiment, the controller 12 acquires the positional difference (e.g., δ, θ, or α) (step S3), and registers the master image and the inspection image on the basis of the positional difference. According to this configuration, it is possible to more accurately register the master image and the inspection image with each other.

Next, with reference to FIGS. 14, 16 to 26, another function of the object inspection system 10 will be described. FIG. 19 is a block diagram illustrating another function of the object inspection system 10. The controller 12 executes the process illustrated in FIG. 14.

Figure 20:
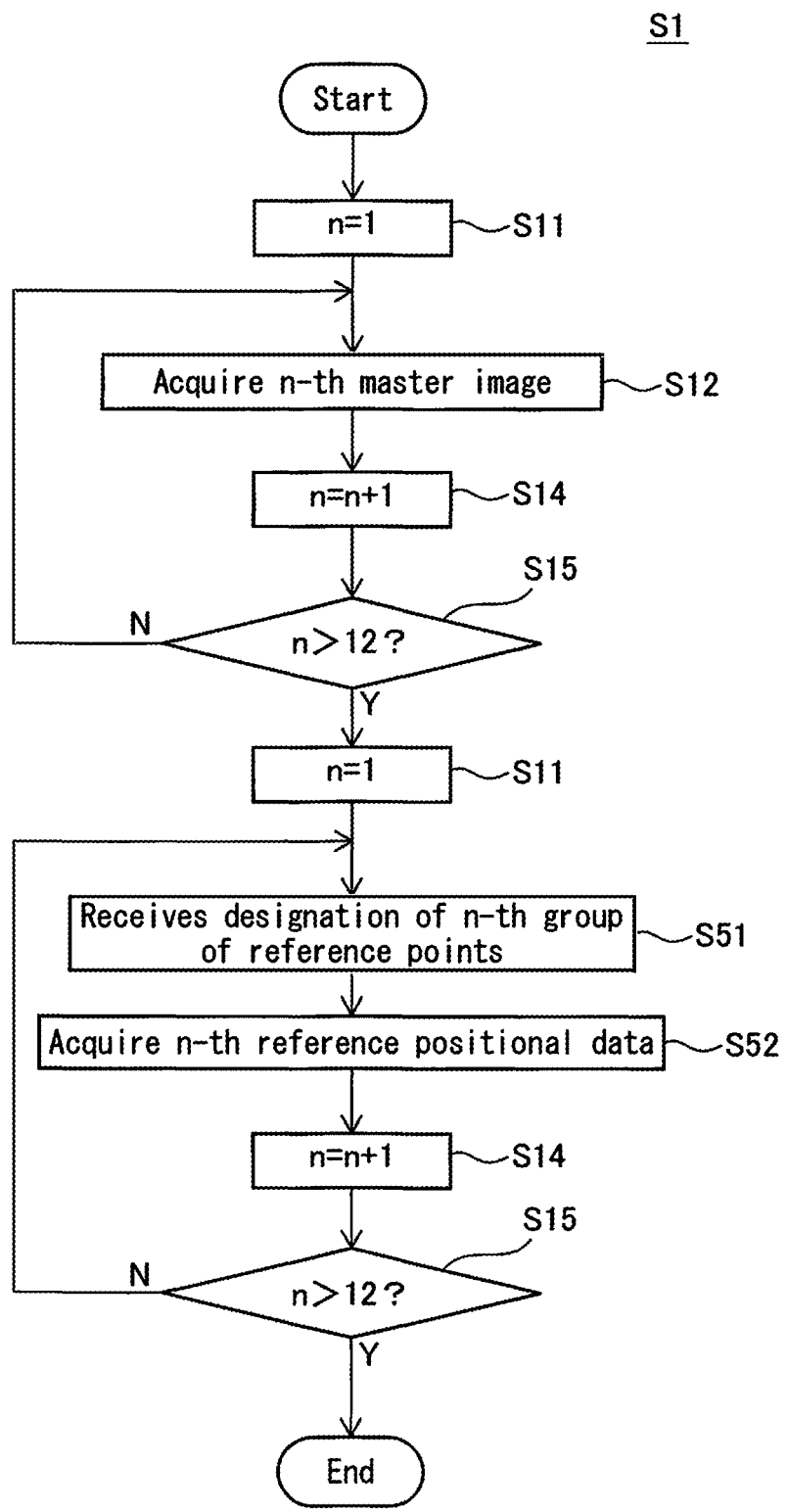
FIG. 20 is a flow chart illustrating an example of the operation process of step S1 in FIG. 14, executed by the object inspection system illustrated in FIG. 19.

In this embodiment, the controller 12 executes the step S1 illustrated in FIG. 20. Note that, in the flow shown in FIG. 20, the same processes as the flow shown in FIG. 15 are assigned the same step numbers, and the overlapping descriptions thereof will be omitted. After the start of step S1, the controller 12 carries out the above-described steps S11, S12, S14, S15 and S11.

In step S51, the controller 12 receives designation of n-th group of reference points to be set on the n-th master image. Assume that the number "n" is set as n=1 at the present moment. In this case, the controller 12 displays the first master image 40 illustrated in FIG. 7 on a display (not illustrated) provided in the object inspection system 10.

Figure 21:
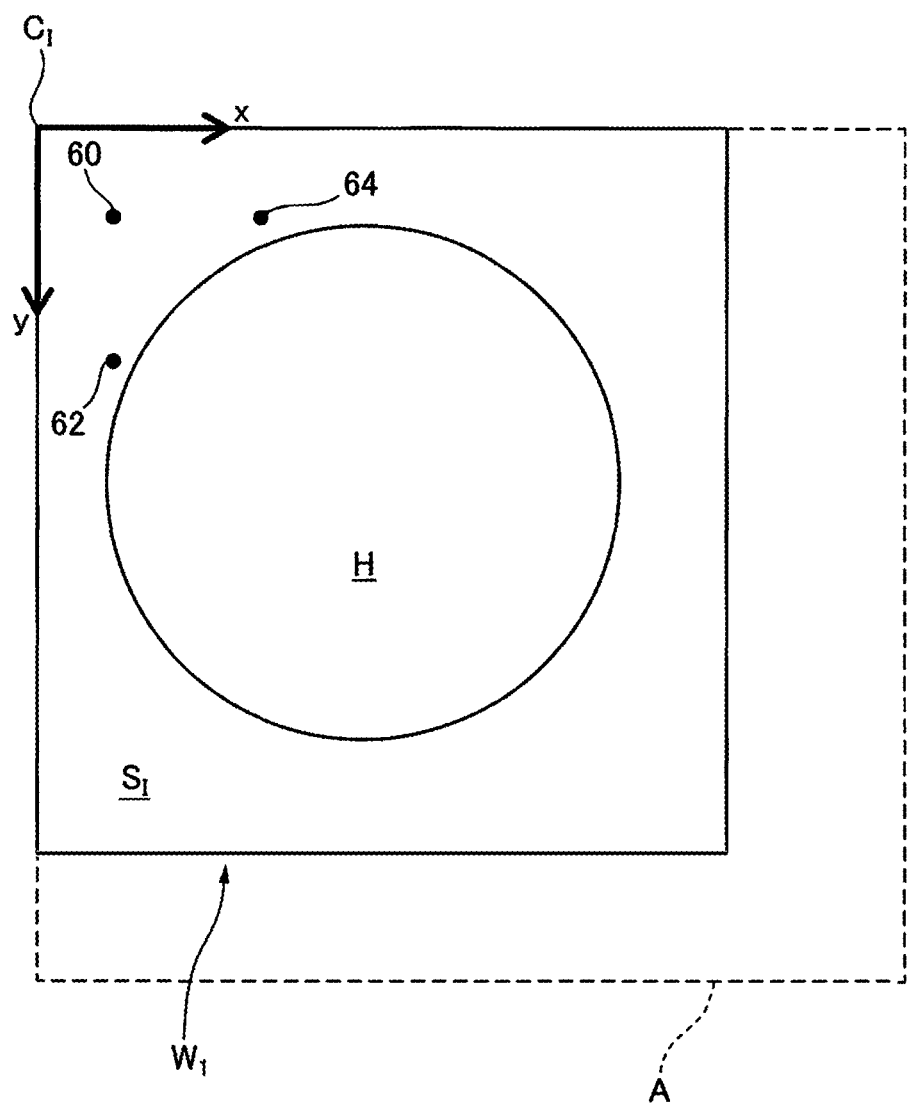
FIG. 21 illustrates an example of a first master image on which reference points are designated.
Figure 25:
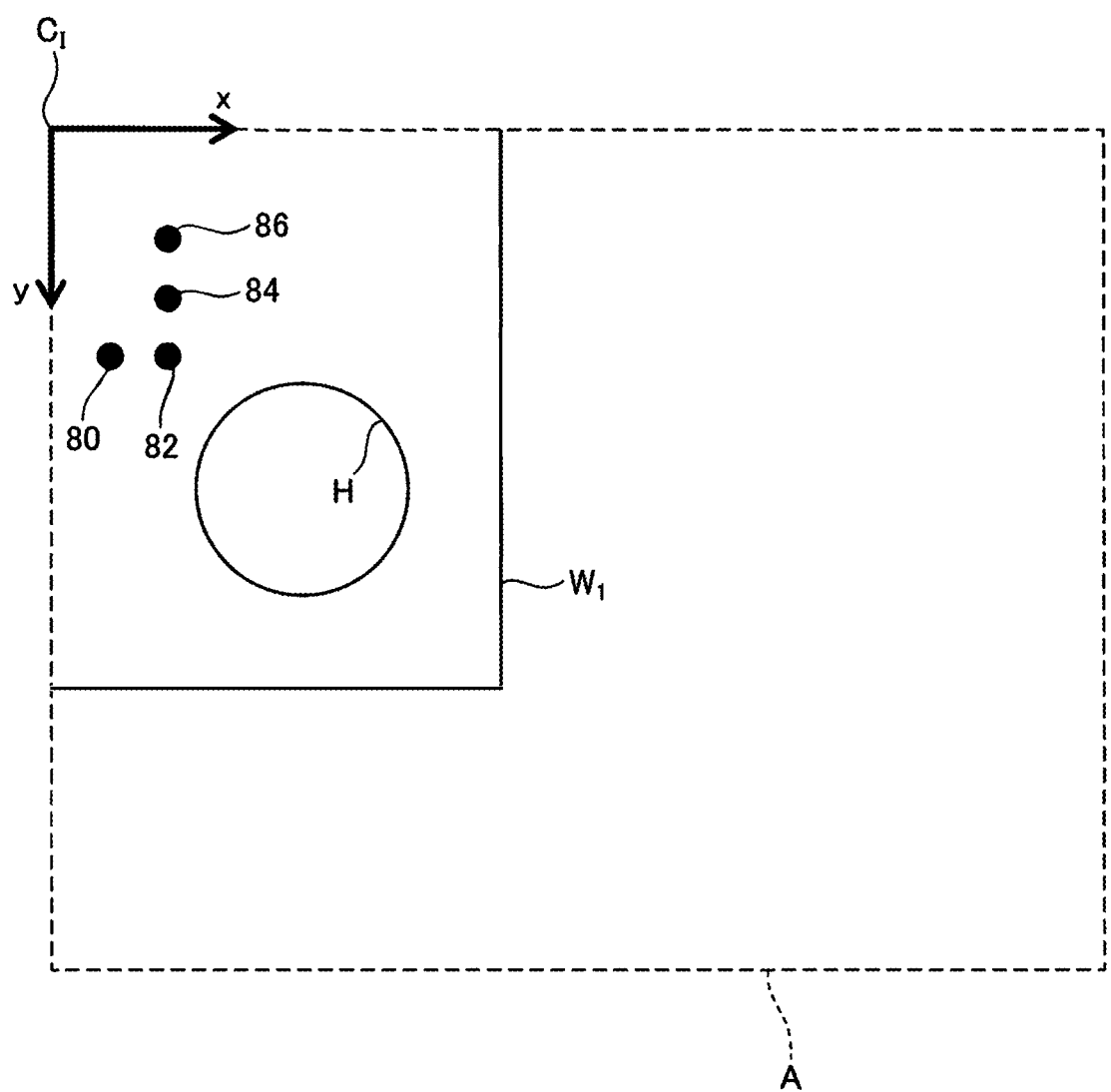
FIG. 25 illustrates an example of a first master image on which reference points are designated.

The operator operates an operation section, such as a keyboard or a touch panel while viewing the first master image 40 displayed on the display, and designates at least one reference point. FIG. 21 illustrates an example in which three reference points 60, 62, and 64 are designated. Further, FIG. 25 illustrates an example in which four reference points 80, 82, 84, and 86 are designated.

The reference points 60, 62 and 64, and the reference points 80, 82, 84 and 86, which are designated for the first master image 40, will be referred to as a first group of reference points 60, 62, and 64, and a first group of reference points 80, 82, 84, and 86.

The controller 12 receives the designation of the first group of reference points 60, 62, and 64 (or 80, 82, 84, and 86). Thus, in this embodiment, the controller 12 functions as a reference point reception section 70 (FIG. 19) configured to receive the designation of the reference points.

In step S52, the controller 12 acquires the n-th reference positional data. More specifically, the controller 12 acquires, as the n-th reference positional data, the coordinates of the n-th group of reference points in the robot coordinate system $C_R$, as well as the coordinates of the n-th group of reference points in the tool coordinate system $C_T$.

Assume that the number "n" is set as n=1 at the present moment. In this case, the controller 12 first acquires the coordinates in the image coordinate system $C_I$ of the first group of reference points 60, 62, and 64 (or 80, 82, 84, and 86) designated in step S51.

Then, the controller 12 transforms the coordinates of the first group of reference points 60, 62, and 64 (or 80, 82, 84, and 86) in the image coordinate system $C_I$ to those in the robot coordinate system $C_R$, using the coordinate transformation data (i.e., transformation matrix) between the robot coordinate system $C_R$ and the image coordinate system $C_I$, whereby acquiring the coordinates of the first group of reference points 60, 62, and 64 (or 80, 82, 84, and 86) in the robot coordinate system $C_R$.

Then, the controller 12 acquires the coordinates of the first group of reference points 60, 62, and 64 (or 80, 82, 84, and 86) in the tool coordinate system $C_T$. At this time, the tool coordinate system $C_T$ is disposed at the first position and direction, which correspond to the first reference relative position, in the robot coordinate system $C_R$ (step S12).

Since the positional relation between the robot coordinate system $C_R$ and the tool coordinate system $C_T$ is thus known, the controller 12 can acquire the coordinates of the first group of reference points 60, 62, and 64 (or 80, 82, 84, and 86) in the tool coordinate system $C_T$ by multiplying the coordinates of the first group of reference points 60, 62, and 64 (or 80, 82, 84, and 86) in the robot coordinate system $C_R$ by a transformation matrix. This transformation matrix is e.g. a Jacobian matrix and determined by the position and direction of the tool coordinate system $C_T$ in the robot coordinate system $C_R$.

The coordinates of the first group of reference points 60, 62, and 64 (or 80, 82, 84, and 86) in the tool coordinate system $C_T$ is the data indicative of the positions of the reference points 60, 62, and 64 (or 80, 82, 84, and 86) on the surface $S_1$ of the first object $W_1$.

In this way, the controller 12 acquires, as the positional data of the first group of reference points 60, 62, and 64 (or 80, 82, 84, and 86), the coordinates of the reference points 60, 62, and 64 (or 80, 82, 84, and 86) in the robot coordinate system $C_R$, as well as the coordinates of the reference points 60, 62, and 64 (or 80, 82, 84, and 86) in the tool coordinate system $C_T$.

As described above, when the robot hand 28 grips the first object $W_1$ at the designated gripping position, the first object $W_1$ can be regarded as a component of the movement machine 14. Therefore, the positional data of the first group of reference points 60, 62, and 64 (or 80, 82, 84, and 86) on the first object $W_1$ can be regarded as the first reference positional data of the movement machine 14 when the movement machine 14 disposes the first object $W_1$ and the imaging section 16 at the first reference relative position.

Thus, the controller 12 functions as a positional data acquisition section 66 (FIG. 19). After step S52, the controller 12 sequentially executes steps S14 and S15.

With reference to FIG. 14 again, in step S2, the controller 12 acquires the inspection image (second image) and the inspection positional data (second positional data). This step S2 will be described with reference to FIG. 16.

Step S2 according to this embodiment differs from the above-described embodiment in step S23. Specifically, in step S23, the controller 12 acquires, as the n-th inspection positional data, the positional data of points on the second object $W_2$ (second reference points, referred to as "inspection reference points" hereinafter), that correspond to the n-th group of reference points, when the movement machine 14 disposes the second object $W_2$ and the imaging section 16 at the n-th inspection relative position.

If the number "n" is set as n=1 at the present moment, the controller 12 acquires the positional data of a first group of inspection reference points on the second object $W_2$ corresponding to the first group of reference points 60, 62, and 64 (or 80, 82, 84, and 86).

The first group of inspection reference points are defined such that the positions of the first group of reference points 60, 62, and 64 (or 80, 82, 84, and 86) with respect to the first object $W_1$ (i.e., coordinates in the tool coordinate system $C_T$) are the same as the positions of the first group of inspection reference points with respect to the second object $W_2$.

The controller 12 acquires, as the first inspection positional data, the coordinates of the first group of inspection reference points in the robot coordinate system $C_R$. The coordinates of the first group of inspection reference points in the robot coordinate system $C_R$ can be calculated from the coordinates of the first group of reference points 60, 62, and 64 (or 80, 82, 84, and 86) in the tool coordinate system $C_T$ acquired in step S52, and from the position and direction of the tool coordinate system $C_T$ in the robot coordinate system $C_R$ when the second object $W_2$ and the imaging section 16 are disposed at the first inspection relative position.

Thus, in this step S23, the controller 12 functions as a positional data acquisition section 66 (FIG. 19) to acquire, as the n-th inspection positional data, the coordinates of the n-th group of inspection reference points in the robot coordinate system $C_R$.

With reference to FIG. 14 again, in step S3, the controller 12 acquires a positional difference. This step S3 will be described with reference to FIG. 17. Step S3 according to this embodiment differs from the above-described embodiment in step S33.

Specifically, in step S33, the controller 12 acquires, as the n-th positional difference, the difference in the image coordinate system $C_I$ between the positional data of the n-th group of reference points acquired in step S52 and the positional data of the n-th group of inspection reference points acquired in step S23.

If the number "n" is set as n=1 at the present moment, and the controller 12 transforms the coordinates of the first group of inspection reference points in the robot coordinate system $C_R$ acquired in step S23 to the coordinates in the image coordinate system $C_I$, using the coordinate transformation data (transformation matrix) between the robot coordinate system $C_R$ and the image coordinate system $C_I$.

Figure 22:
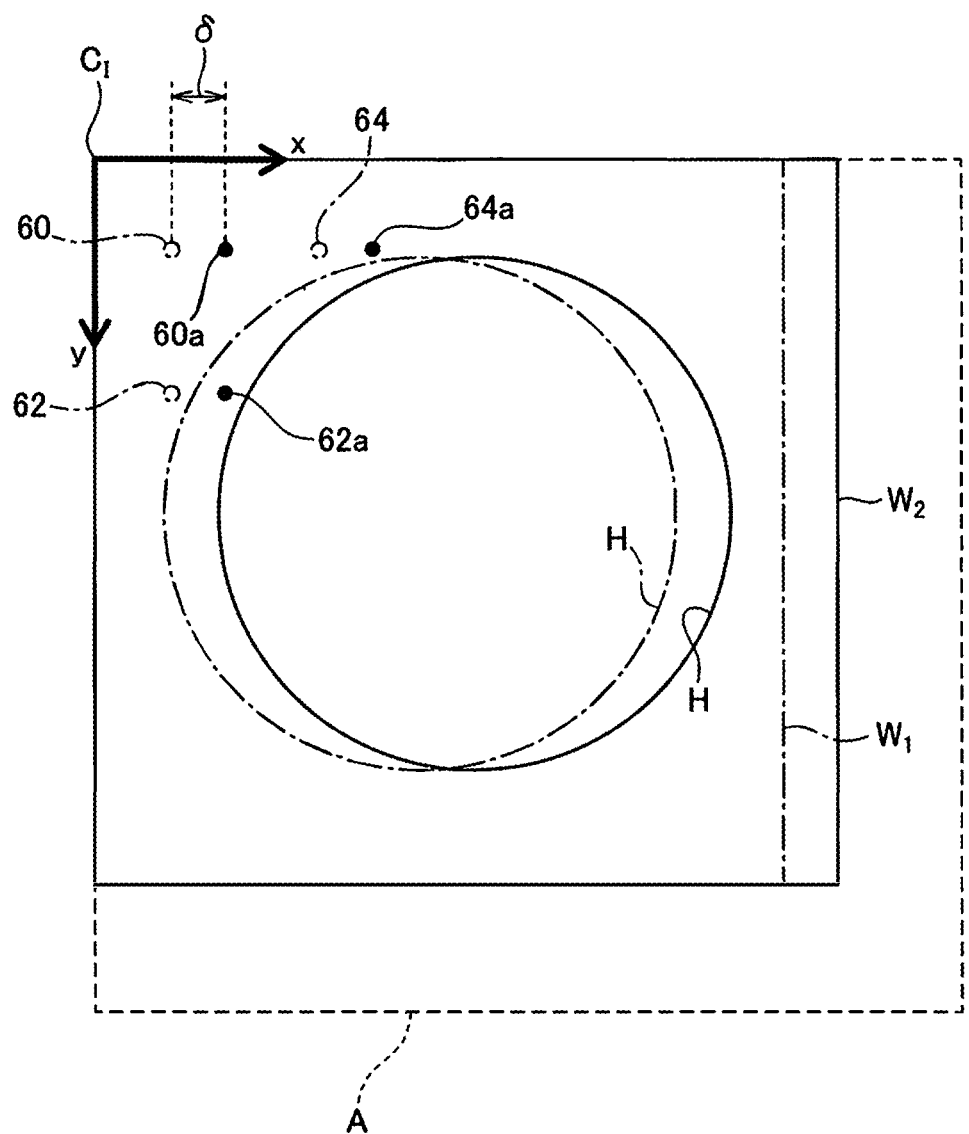
FIG. 22 illustrates an example of a first inspection image on which inspection reference points are plotted.
Figure 23:
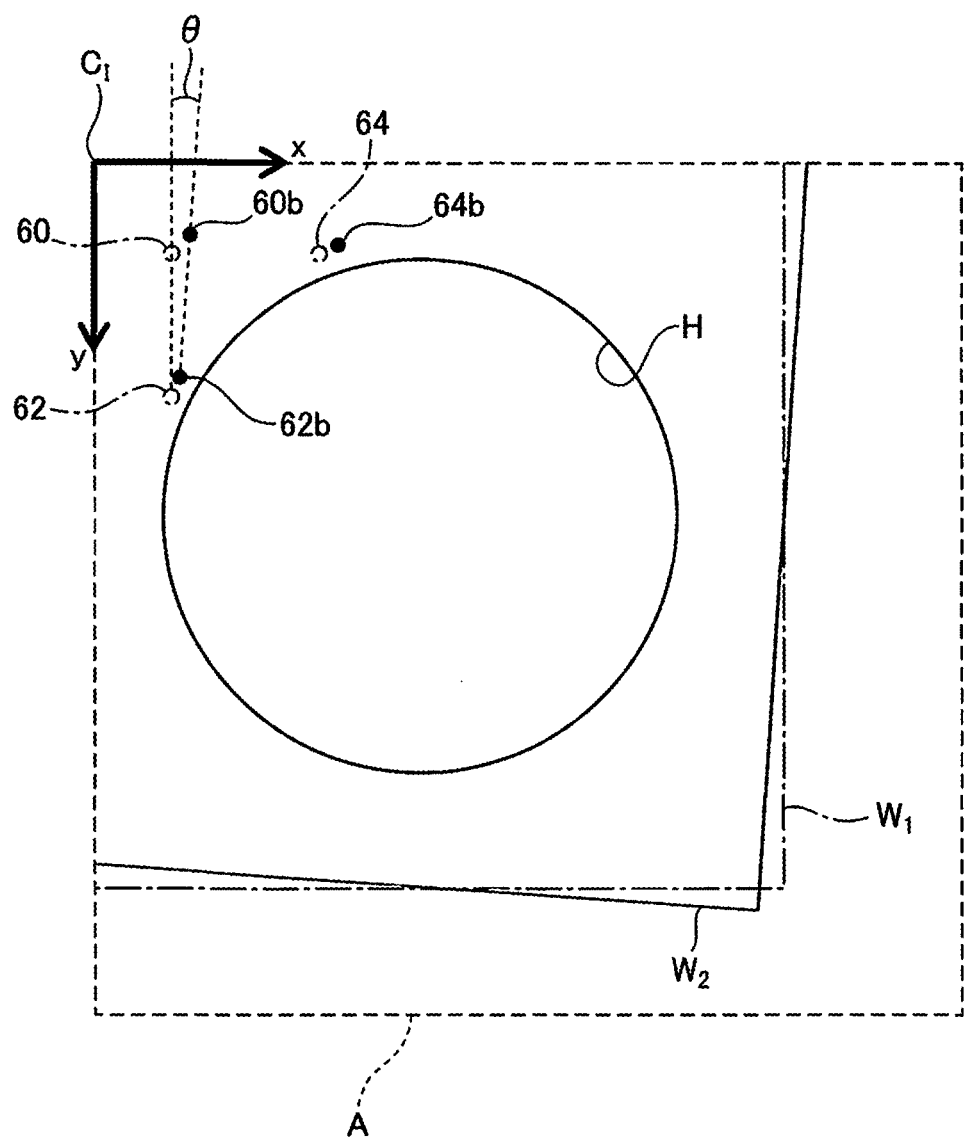
FIG. 23 illustrates an example of a first inspection image on which inspection reference points are plotted.
Figure 24:
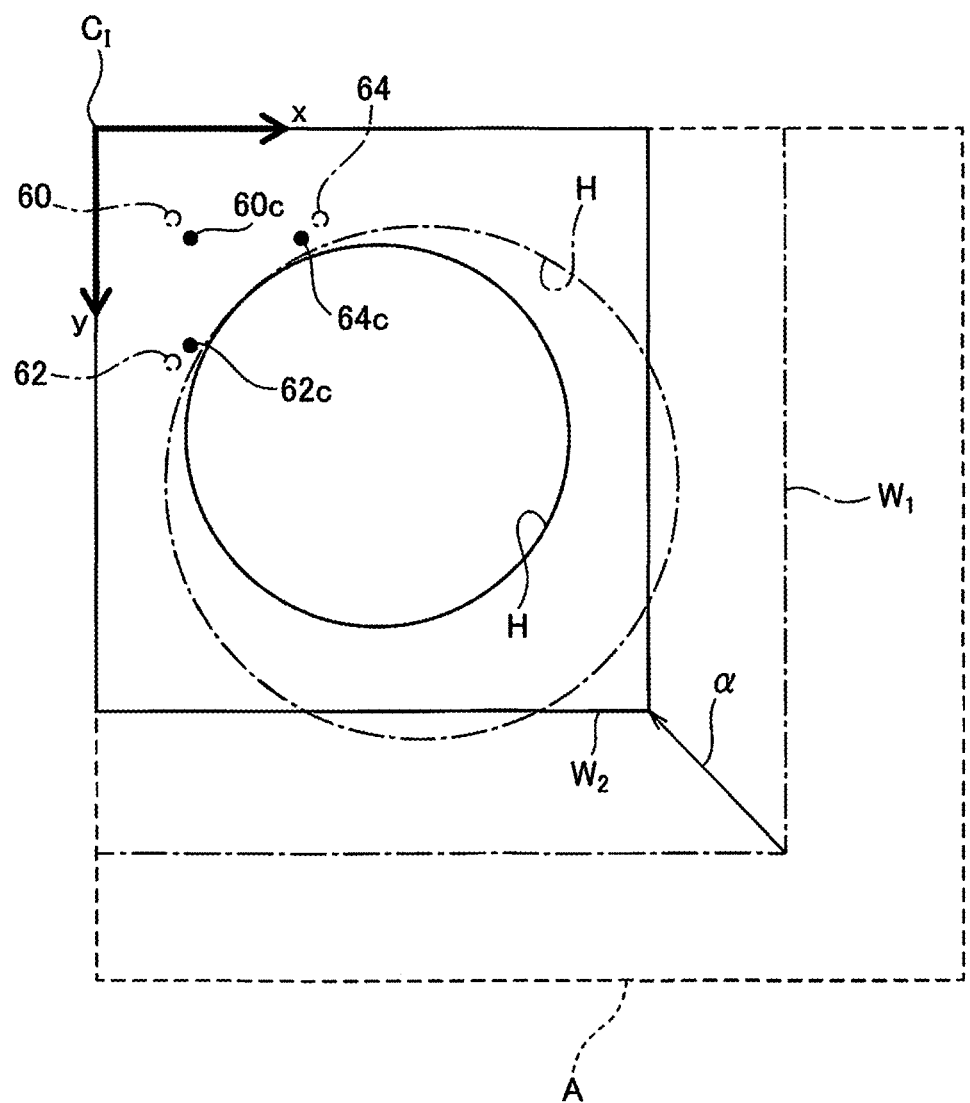
FIG. 24 illustrates an example of a first inspection image on which inspection reference points are plotted.

FIGS. 22 to 24 illustrate the first group of inspection reference points plotted on the first inspection images. Note that, in FIGS. 22 to 24, the image of the first object $W_1$ in the first master image 40 when the first inspection image and the first master image 40 (FIG. 21) are superimposed with reference to the image coordinate system $C_I$ (i.e., the field of view A) is indicated by chain line.

In the first inspection image 48 illustrated in FIG. 22, the first group of inspection reference points 60a, 62a, and 64a corresponding to the first group of reference points 60, 62, and 64 are plotted.

In the first inspection image 48, the image of the second object $W_2$ is displaced from the image of the first object $W_1$ in the first master image 40 by a positional difference δ in the x-axis positive direction of the image coordinate system $C_I$. Such a displacement coincides with the positional difference in the image coordinate system $C_I$ between the reference point 60 and the inspection reference point 60a, between the reference point 62 and the inspection reference point 62a, and between the reference point 64 and the inspection reference point 64a.

The controller 12 acquires, as the first positional difference δ, the difference between the coordinates of the reference point 60, 62, or 64 and the coordinates of the inspection reference point 60a, 62a, or 64a in the image coordinate system $C_I$.

In the first inspection image 50 illustrated in FIG. 23, the first group of inspection reference points 60b, 62b, and 64b corresponding to the first group of reference points 60, 62, and 64 are plotted.

In the first inspection image 50, the image of the second object $W_2$ in the first inspection image 50 is rotated from the image of the first object $W_1$ in the first master image 40 about the optical axis O of the imaging section by a positional difference θ.

As an example, on the basis of the coordinates in the image coordinate system $C_I$ of the reference points 60, 62, and 64 and of the inspection reference points 60b, 62b, and 64b, the controller 12 calculates an angle formed by a straight line passing through two of the reference points 60, 62, and 64 (e.g., reference points 60 and 62) and a straight line passing through two of the inspection reference points 60b, 62b, and 64b (e.g., inspection reference points 60b and 62b) that correspond to the two of the reference points 60, 62, and 64. The controller 12 acquires the angle as the positional difference θ.

In the first inspection image 52 illustrated in FIG. 24, the first group of inspection reference points 60c, 62c, and 64c corresponding to the first group of reference points 60, 62, and 64 are plotted.

In the first inspection image 52, the image of the second object $W_2$ in the first inspection image 52 is reduced with respect to the image of the first object $W_1$ in the first master image 40 by a positional difference α.

As an example, on the basis of the coordinates in the image coordinate system $C_I$ of the reference points 60, 62, and 64 and of the inspection reference points 60c, 62c, and 64c, the controller 12 calculates the ratio of the area of the figure (a triangle in this embodiment) defined by the reference points 60, 62, and 64 to the area of the figure defined by the inspection reference points 60c, 62c, and 64c in the image coordinate system $C_I$. The controller 12 calculates the positional difference α based on the calculated ratio.

Figure 26:
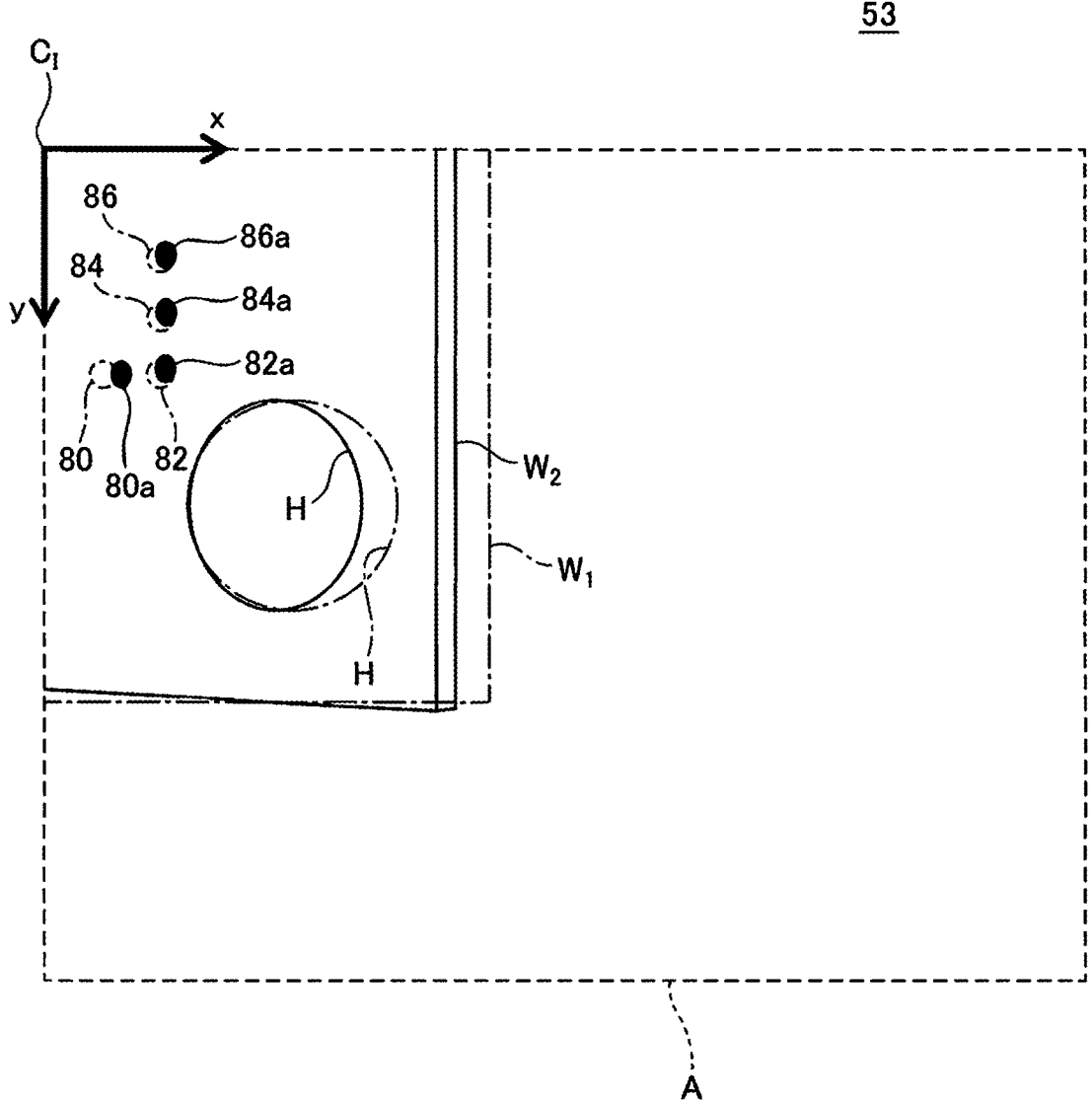
FIG. 26 illustrates an example of a first inspection image on which inspection reference points are plotted.

FIG. 26 illustrates the first group of inspection reference points 80a, 82a, 84a, and 86a plotted on the first inspection image 53. In the first inspection image 53 illustrated in FIG. 26, the first group of inspection reference points 80a, 82a, 84a, and 86a corresponding to the first group of reference points 80, 82, 84, and 86 illustrated in FIG. 25 are plotted. Note that, in FIG. 26, the first group of reference points 80, 82, 84, and 86 are indicated by chain line.

As an example, the controller 12 calculates a matrix M that satisfies following equations 1-4, using the coordinates $C_{R\_80}$, $C_{R\_82}$, $C_{R\_84}$, and $C_{R\_86}$ of the first group of reference points 80, 82, 84, and 86 in the robot coordinate system $C_R$, which have been acquired in the above-described step S52, and the coordinates $C_{R\_80a}$, $C_{R\_82a}$, $C_{R\_84a}$, and $C_{R\_86a}$ of the first group of inspection reference points 80a, 82a, 84a, and 86a in the robot coordinate system $C_R$, which have been acquired in the above-described step S23.

$$C_{R\_80} = M \cdot C_{R\_80a} \quad \text{(equation 1)}$$

$$C_{R\_82} = M \cdot C_{R\_82a} \quad \text{(equation 2)}$$

$$C_{R\_84} = M \cdot C_{R\_84a} \quad \text{(equation 3)}$$

$$C_{R\_86} = M \cdot C_{R\_86a} \quad \text{(equation 4)}$$

Herein, the coordinates $C_{R-80}$ represent the coordinates of the reference point 80 in the robot coordinate system $C_R$, and the coordinates $C_{R-80a}$ represent the coordinates of the inspection reference point 80a in the robot coordinate system $C_R$. This is also applicable to the other coordinates $C_{R-82}$, $C_{R-84}$, $C_{R-86}$, $C_{R-82a}$, $C_{R-84a}$, and $C_{R-86a}$.

Each parameter of the matrix M can be calculated from the equations 1 to 4. The matrix M thus calculated is e.g. a homography matrix and expresses the first positional difference between the image of the second object $W_2$ in the first inspection image 53 and the image of the first object $W_1$ in the first master image 40 illustrated in FIG. 26.

Thus, the controller 12 acquires the n-th positional difference (α, θ, α, M) between the n-th master image and the n-th inspection image in the image coordinate system $C_I$. Therefore, the controller 12 functions as the image positional difference acquisition section 68 (FIG. 19) configured to acquire the n-th positional difference.

With reference to FIG. 14 again, after step S3, in step S4, the controller 12 functions as the image registering section 56 to register the master image and the inspection image. When the positional difference δ, θ, or α has been acquired in step S33, in step S43, the controller 12 shifts the first master image 40 or the first inspection image 48, 50, 52 on the basis of the first positional difference (δ, θ, α) so as to register these two images, similarly as the above-described embodiment.

On the other hand, when the matrix (including the matrix M) has been acquired as the n-th positional difference in step S33, in step S43, the controller 12 transforms the n-th inspection image (53) with the matrix (M).

Then, the controller 12 superimposes the transformed n-th inspection image and the n-th master image (40) on each other with reference to the image coordinate system $C_I$. Whereby, the image of the second object $W_2$ in the transformed n-th inspection image can be coincided with the image of the first object $W_1$ in the n-th master image (40).

When the n-th inspection image (53) transformed with the matrix (M) is superimposed on the n-th master image and there is still a displacement between the image of the second object $W_2$ in the transformed n-th inspection image and the image of the first object $W_1$ in the n-th master image (40), the controller 12 may further shift the transformed n-th inspection image or the n-th master image (40) on the x-y plane of the image coordinate system $C_I$ so as to register these two images (40).

After step S4, in step S5, the controller 12 inspects whether or not there is any visually recognizable error in the second object $W_2$ with respect to the first object $W_1$.

Thus, in this embodiment, the controller 12 acquires the positional data of the reference points (60, 62, 64, 80, 82, 84, 86) on the first object $W_1$ and the positional data of the inspection reference points (second reference points) on the second object $W_2$ (step S52, S23), and using these positional data, acquires the positional difference between the master image (40) and the inspection image (48, 50, 52). According to this configuration, it is possible to calculate the positional difference between the master image and the inspection image with high precision.

Further, in this embodiment, the controller 12 receives the designation of the reference point (60, 62, 64, 80, 82, 84, 86) from the operator (step S51). According to this configuration, the operator can arbitrarily set the reference point to be used for registering the master image and the inspection image.

Note that, the controller 12 may set a feature point of the first object $W_1$ as a reference point. The feature point may be e.g. the center point of the hole H, an edge of the first object $W_1$, a pattern or shape formed on the surface $S_I$ of the first object $W_1$. In this case, the controller 12 detects the feature point of the first object $W_1$ in step S51, e.g. by carrying out image processing.

Figure 27:
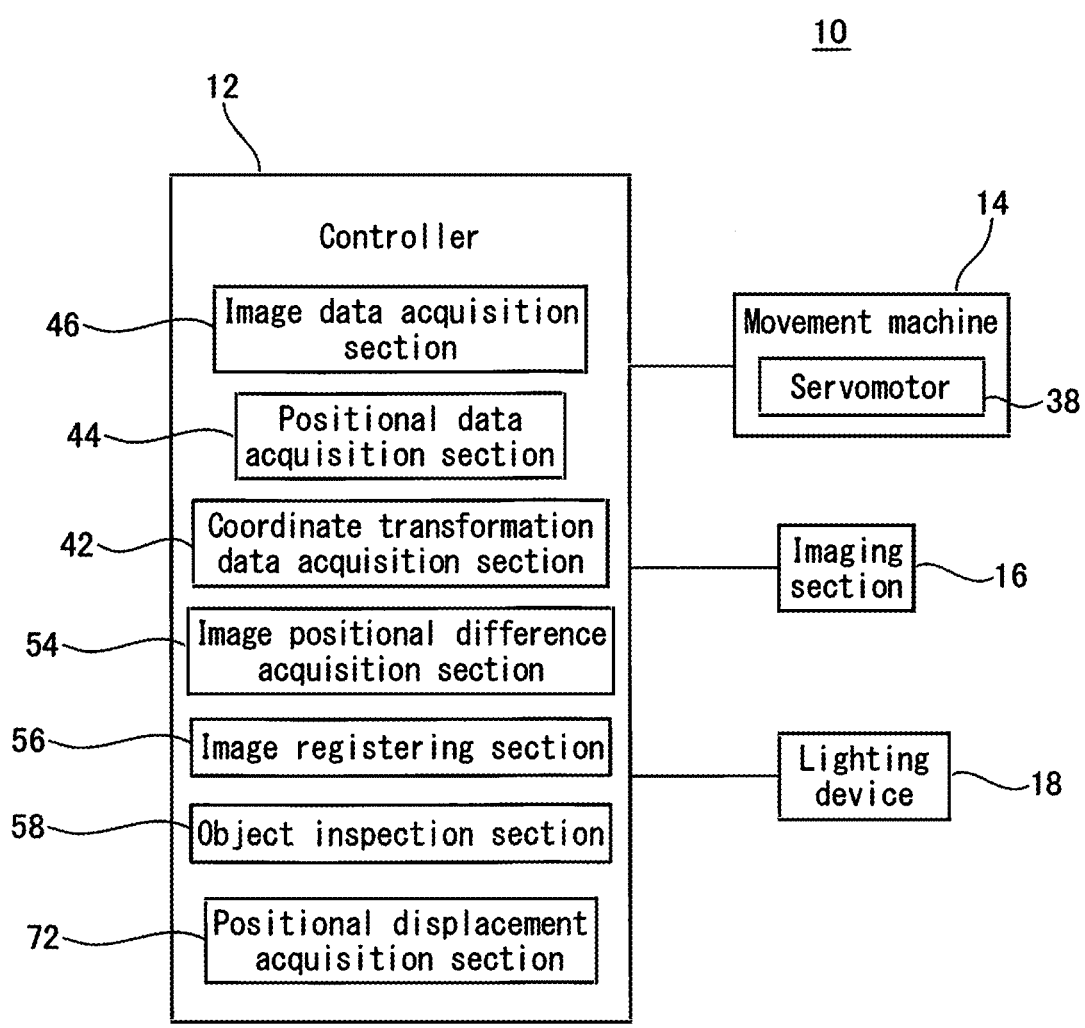
FIG. 27 is a block diagram illustrating still another function of the object inspection system.

Next, with reference to FIG. 27, still another function of the object inspection system 10 will be described. FIG. 27 is a block diagram illustrating still another function of the object inspection system 10. When the movement machine 14 moves the second object $W_2$ in the above-described step S22, the position at which the robot hand 28 grips the second object $W_2$ (i.e., the position of the second object $W_2$ relative to the robot hand 28 (or tool coordinate system $C_T$)) may be displaced from the designated gripping position.

In this embodiment, the controller 12 acquires a positional displacement between the position at which the robot hand 28 grips the second object $W_2$ and the designated gripping position. Such a positional displacement may be obtained e.g. by carrying out image processing on the image captured by the imaging section 16 (e.g., the n-th inspection image), or may be detected by providing another imaging section for detecting the positional displacement.

The controller 12 functions as a positional displacement acquisition section 72 (FIG. 27) to acquire the detected positional displacement. When the positional displacement is acquired, the controller 12 calculates the positional displacement in the robot coordinate system $C_R$, and when disposing the second object $W_2$ and the imaging section 16 at the n-th inspection relative position in above-described step S22, operates the movement machine 14 and moves the second object $W_2$ with respect to the imaging section 16 so as to cancel the positional displacement.

Alternatively, the controller 12 may acquire a positional displacement in the image coordinate system, which can be obtained by transforming the positional displacement in the robot coordinate system $C_R$ into that in the image coordinate system $C_I$, and in the above-described step S43, register the master image and the inspection image further using the positional displacement in the image coordinate system.

According to this configuration, even when the position at which the robot hand 28 grips the second object $W_2$ is displaced from the designated gripping position, it is possible to register the master image and the inspection image.

Figure 28:
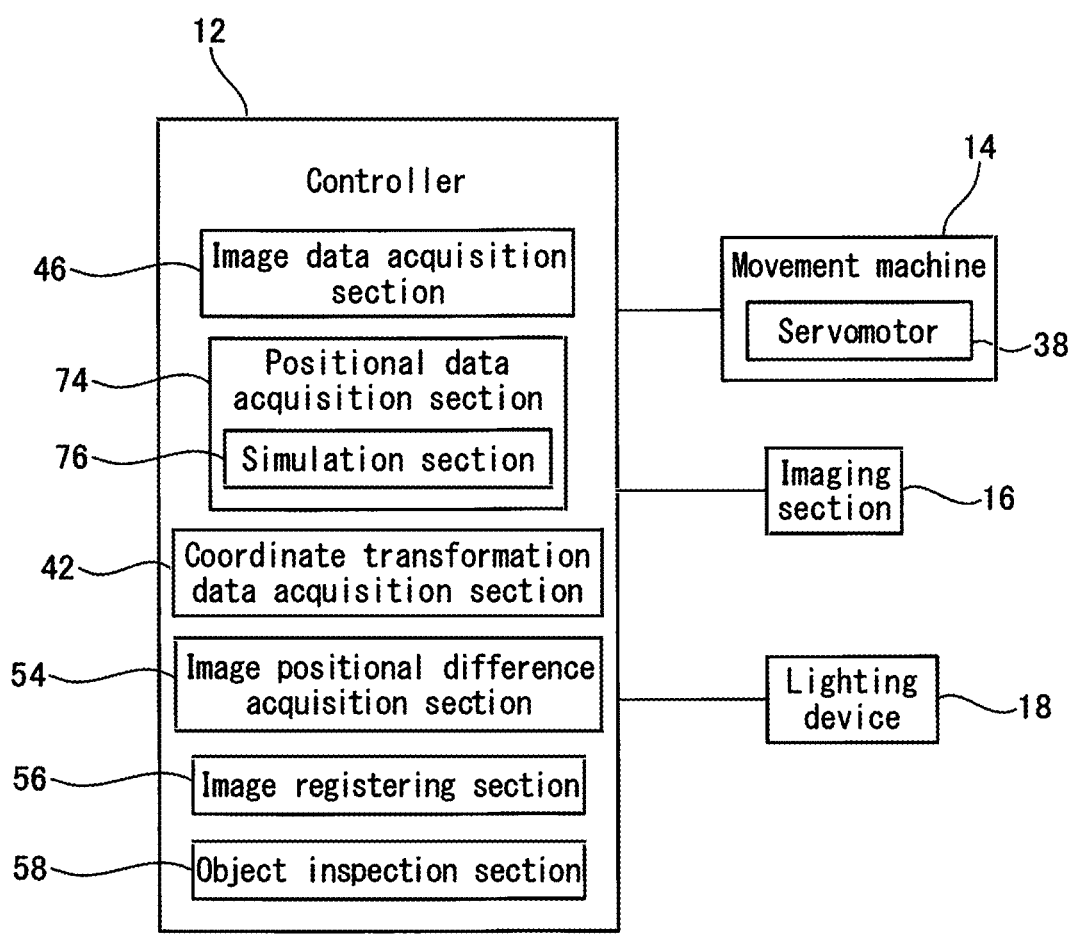
FIG. 28 is a block diagram illustrating still another function of the object inspection system.

Next, with reference to FIG. 28, still another function of the object inspection system 10 will be described. FIG. 28 is a block diagram illustrating still another function of the object inspection system 10. In this embodiment, the controller 12 acquires the above-described n-th reference positional data by simulation.

Specifically, the controller 12 disposes an imaging section model, which is a model of the imaging section 16, a machine model, which is a model of the movement machine 14, and an object model, which is a model of the first object $W_1$, in a model environment which is a virtual space.

The controller 12 then virtually operates the imaging section model and the machine model in the model environment so as to dispose the imaging section model and the machine model at the n-th reference relative position. The controller 12 acquires, as the n-th reference positional data, the positional data of the machine model when the imaging section model and the machine model are disposed at the n-th reference relative position in the model environment.

Thus, in this embodiment, the controller 12 functions as a positional data acquisition section 74 to acquire the n-th reference positional data, wherein the positional data acquisition section 74 includes a simulation section 76 configured to acquire the n-th reference positional data by simulation. According to this configuration, since the n-th reference positional data can be acquired by simulation without teaching the actual movement machine 14, it is possible to reduce the work for teaching.

Next, with reference to FIGS. 2 and 29, an object inspection system 100 according to another embodiment will be described. The object inspection system 100 differs from the above-described object inspection system 10 in the following configuration.

Specifically, in the object inspection system 100, the imaging section 16 is fixed to the wrist 26 of the movement machine 14. On the other hand, the objects $W_1$ and $W_2$ are to be fixed to a workpiece holder 102, and disposed at a predetermined position in the robot coordinate system $C_R$ so as to be separate away from the movement machine 14. The storage of the controller 12 pre-stores the information of the fixed positions of the objects $W_1$ and $W_2$ in the robot coordinate system $C_R$.

In this embodiment, a tool coordinate system $C_T$ is set for the imaging section 16. This tool coordinate system $C_T$ is one of the coordinate systems for automatic control, and the position and orientation of the imaging section 16 in space are defined by expressing the position of the tool coordinate system $C_T$ in the robot coordinate system $C_R$.

In this embodiment, the tool coordinate system $C_T$ is set such that the z-axis of the tool coordinate system $C_T$ coincides with the optical axis O of the imaging section 16. Thus, the image coordinate system $C_I$ is disposed in a predetermined positional relation with the tool coordinate system $C_T$.

The controller 12 has information of the position and direction of the tool coordinate system $C_T$ in the robot coordinate system $C_R$. Therefore, the positional relation between the robot coordinate system $C_R$ and the image coordinate system $C_I$ is known through the tool coordinate system $C_T$.

The controller 12 operates the swiveling body 22, the robot arm 24, and the wrist 26 in the robot coordinate system $C_R$ such that the position and orientation of the imaging section 16 coincide with those defined by the tool coordinate system $C_T$. Thus, the imaging section 16 is disposed at any position and orientation in the robot coordinate system $C_R$.

The controller 12 of the object inspection system 100 can register the master image and the inspection image and inspect whether or not there is any error in the inspection image with respect to the master image, by carrying out the flows illustrated in FIGS. 14 to 18, similarly as the above-mentioned object inspection system 10.

The processes in the operational flow of the object inspection system 100, which are different from the object inspection system 10, will be described below. When the flow illustrated in FIG. 14 is started, the first object $W_1$ is fixed to the workpiece holder 102.

Figure 15:
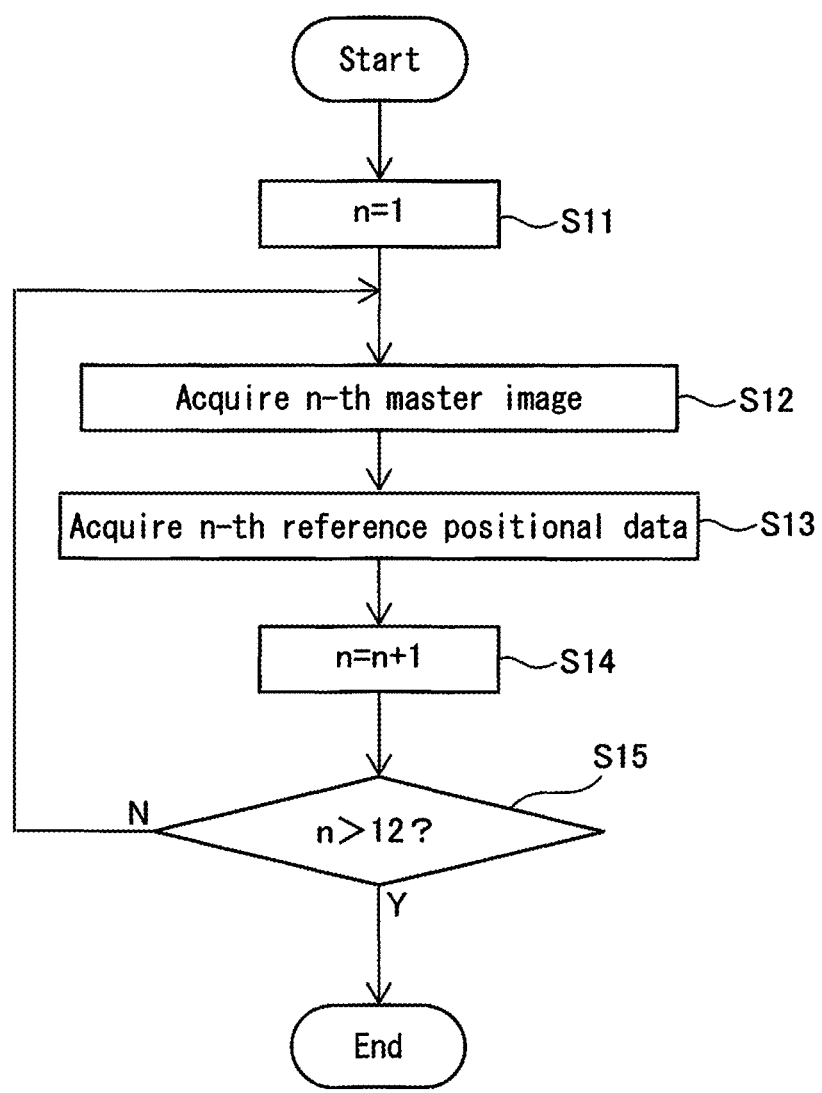
FIG. 15 is a flow chart illustrating an example of the operation process of step S1 in FIG. 14.

With reference to FIG. 15, in step S12, the controller 12 functions as the image data acquisition section 46 (FIG. 2) to acquire the n-th master image. More specifically, the controller 12 operates the movement machine 14 so as to dispose the imaging section 16 at the n-th reference relative position with respect to the first object $W_1$. The controller 12 then causes the imaging section 16 to image the surface $S_I$ of the first object $W_1$, and acquires the n-th master image.

Figure 29:
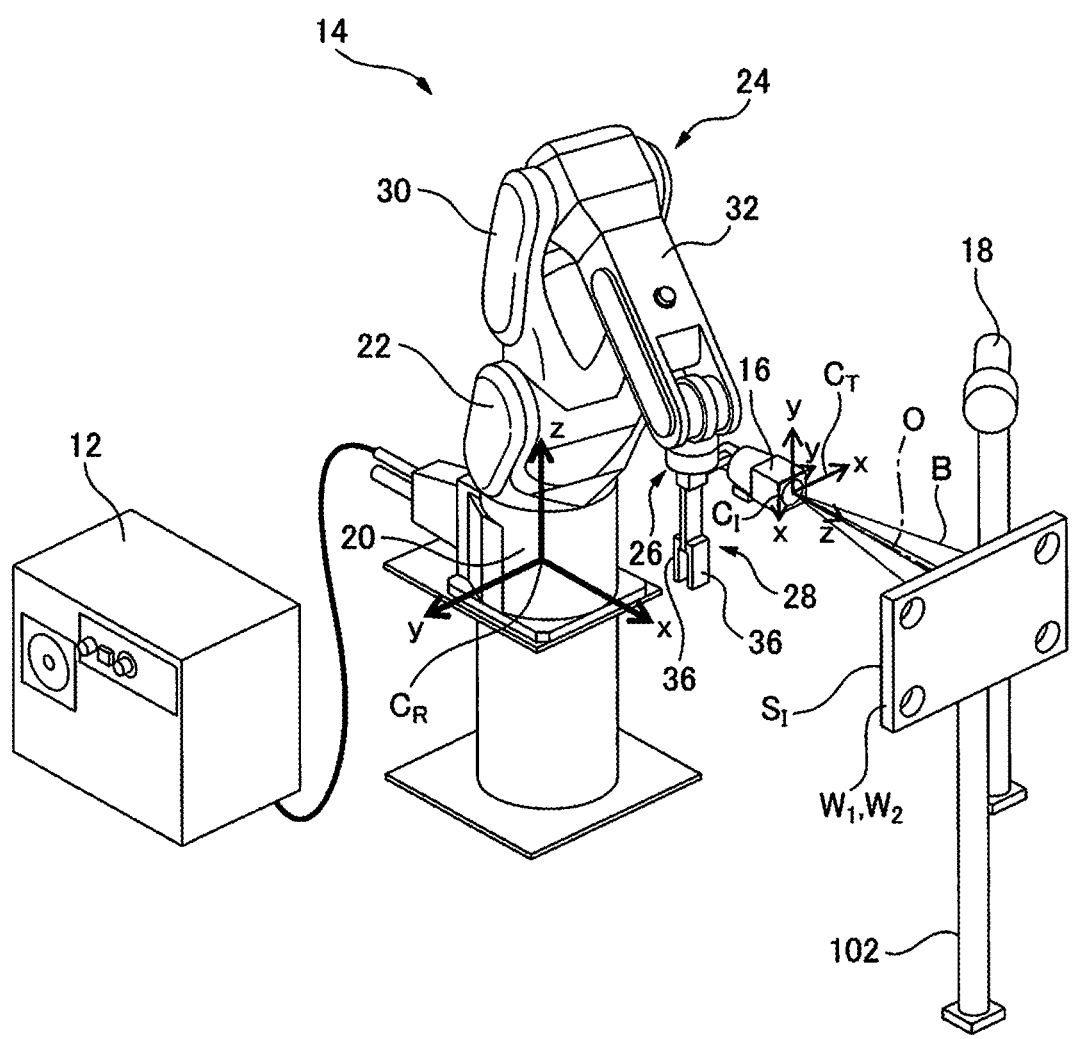
FIG. 29 is a diagram illustrating an object inspection system according to another embodiment.

If the number "n" is set as n=1 at the start of step S12, the controller 12 disposes the imaging section 16 and the first object $W_1$ at the first reference relative position illustrated in FIG. 29, and causes the imaging section 16 to image the surface $S_I$ of the first object $W_1$. As a result, the controller 12 acquires the first master image 40 illustrated in FIG. 7.

Each time the controller 12 disposes the imaging section 16 and the first object $W_1$ at the n-th reference relative position (i.e., n=1 to 12), the controller 12 functions as the coordinate transformation data acquisition section 42 (FIG. 2) to acquire information on the positional relation between the robot coordinate system $C_R$ and the image coordinate system $C_I$ (coordinate transformation data).

In step S13, the controller 12 functions as the positional data acquisition section 44 (FIG. 2) to acquire the n-th reference positional data. More specifically, the controller 12 acquires, as the n-th reference positional data, the positional data of the movement machine 14 when the imaging section 16 and the first object $W_1$ are disposed at the n-th reference relative position.

For example, the controller 12 acquires, as the n-th reference positional data, information of the position and direction of the tool coordinate system $C_T$ in the robot coordinate system $C_R$ when the imaging section 16 and the first object $W_1$ are disposed at the n-th reference relative position.

Figure 16:
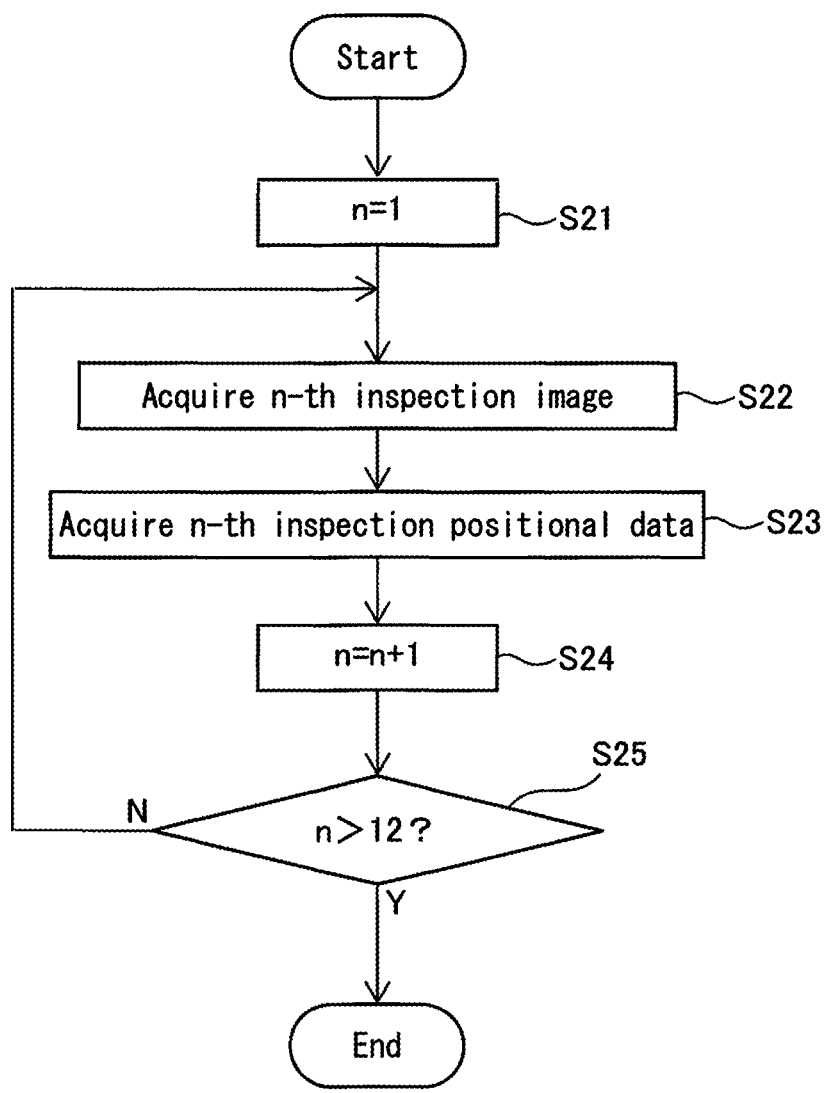
FIG. 16 is a flow chart illustrating an example of the operation process of step S2 in FIG. 14.

When step S1 illustrated in FIG. 15 is ended, the second object $W_2$ is fixed to the workpiece holder 102. With reference to FIG. 16, in step S22, the controller 12 acquires the n-th inspection image. More specifically, the controller 12 operates the movement machine 14 so as to dispose the imaging section 16 at the n-th inspection relative position with respect to the second object $W_2$. The controller 12 then causes the imaging section 16 to image the surface $S_I$ of the second object $W_2$, and acquires the n-th inspection image.

If the number "n" is set as n=1 at the start of step S12, the controller 12 disposes the imaging section 16 and the first object $W_1$ at the first inspection relative position, and images the surface $S_I$ of the first object $W_1$ by the imaging section 16 so as to acquire the first inspection image 48, 50, or 52 illustrated in FIG. 9, 10, or 11.

Each time the controller 12 disposes the imaging section 16 and the second object $W_2$ at the n-th inspection relative position, the controller 12 functions as the coordinate transformation data acquisition section 42 to acquire information on the positional relation between the robot coordinate system $C_R$ and the image coordinate system $C_I$ (coordinate transformation data).

In step S23, the controller 12 acquires the n-th inspection positional data. More specifically, the controller 12 acquires, as the n-th inspection positional data, the positional data of the movement machine 14 when the imaging section 16 and the second object $W_2$ are disposed at the n-th inspection relative position.

Figure 17:
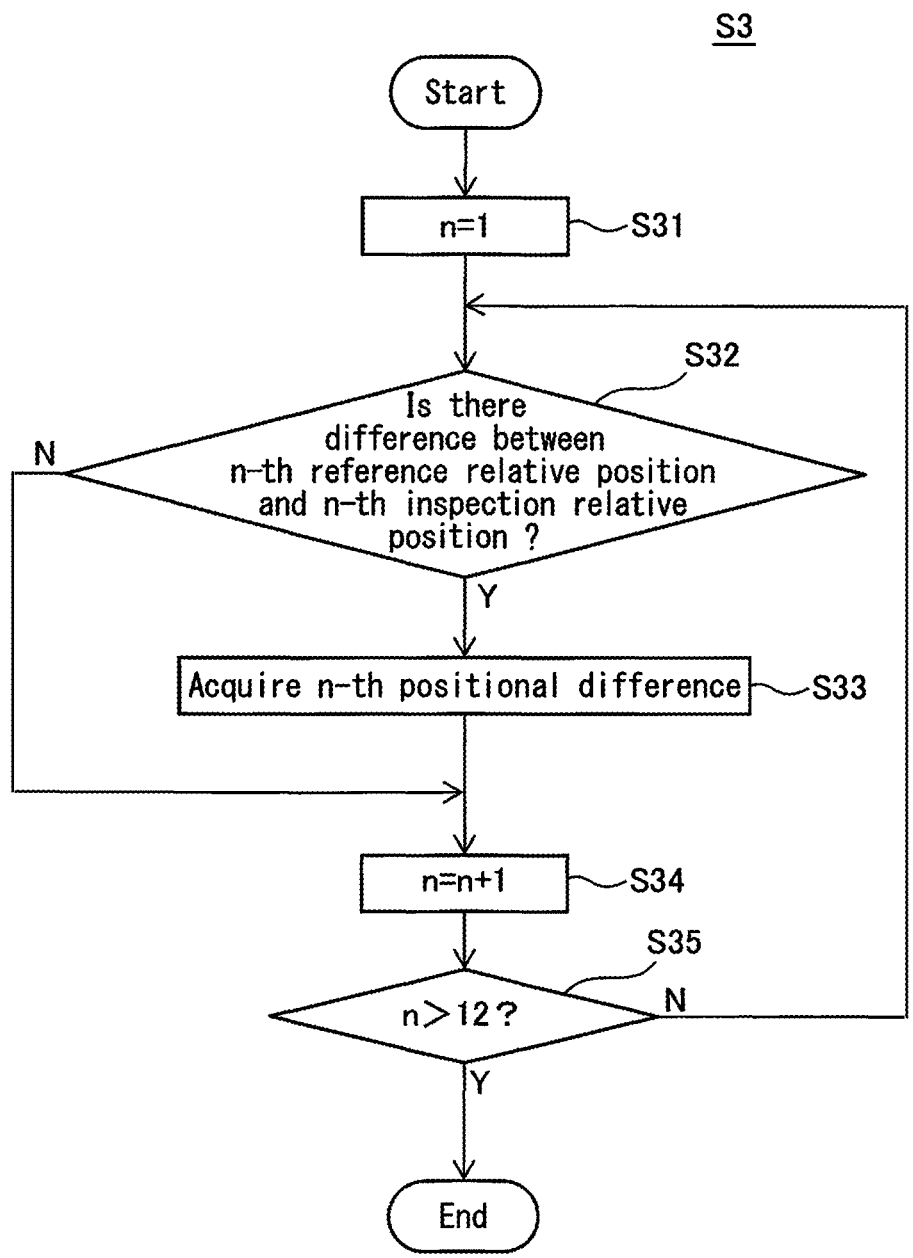
FIG. 17 is a flow chart illustrating an example of the operation process of step S3 in FIG. 14.

With reference to FIG. 17, in step S33, the controller 12 functions as the image positional difference acquisition section 54 (FIG. 2) to acquire the n-th positional difference. If the number "n" is set as n=1 at the start of step S33, the controller 12 acquires the first positional difference $\delta$, $\theta$, $\alpha$ or M between the first master image 40 and the first inspection image 48, 50, 52 or 53 in the image coordinate system $C_I$.

For example, regarding the first positional difference $\delta$ or $\theta$, the controller 12 calculates the coordinates in the robot coordinate system $C_R$ of the position and direction of the tool coordinate system $C_T$ included in the first reference positional data, and the coordinates in the robot coordinate system $C_R$ of the position and direction of the tool coordinate system $C_T$ included in the first inspection positional data, and calculates the difference $\Delta_{R1}$ between these two sets of coordinates.

The controller 12 then transforms the difference $\Delta_{R1}$ expressed as the coordinates in the robot coordinate system $C_R$ into that in the image coordinate system $C_I$ at the time of execution of step S22 (or S12), using the coordinate transformation data acquired in step S22 (or S12). The positional difference $\delta$ or $\theta$ in the first inspection image 48, 50 (or the first master image 40) in the image coordinate system $C_I$ is thereby calculated.

Further, regarding the above-described positional difference $\alpha$, the controller 12 calculates the distances $D_1$ and $D_2$ from the coordinates in the robot coordinate system $C_R$ of the position of the tool coordinate system $C_T$ included in the first reference positional data and the coordinates in the robot coordinate system $C_R$ of the position of the tool coordinate system $C_T$ included in the first inspection positional data. The controller 12 then calculates the positional difference $\alpha$ representing the reduction rate (or enlargement rate) of the first inspection image 52 to the first master image 40 from the ratio of the calculated $D_1$ and $D_2$.

When acquiring the matrix M as a positional difference, the controller 12 calculates each parameter of the matrix M, e.g. by using the coordinates $C_{R\_80}$, $C_{R\_82}$, $C_{R\_84}$, and $C_{R\_86}$ of the first group of reference points 80, 82, 84, and 86 in the robot coordinate system $C_R$, which are included in the first reference positional data, and the coordinates $C_{R\_80a}$, $C_{R\_82a}$, $C_{R\_84a}$, and $C_{R\_86a}$ of the first group of inspection reference points 80a, 82a, 84a, and 86a in the robot coordinate system $C_R$, which are included in the first inspection positional data, similarly as the above-mentioned embodiment.

Figure 18:
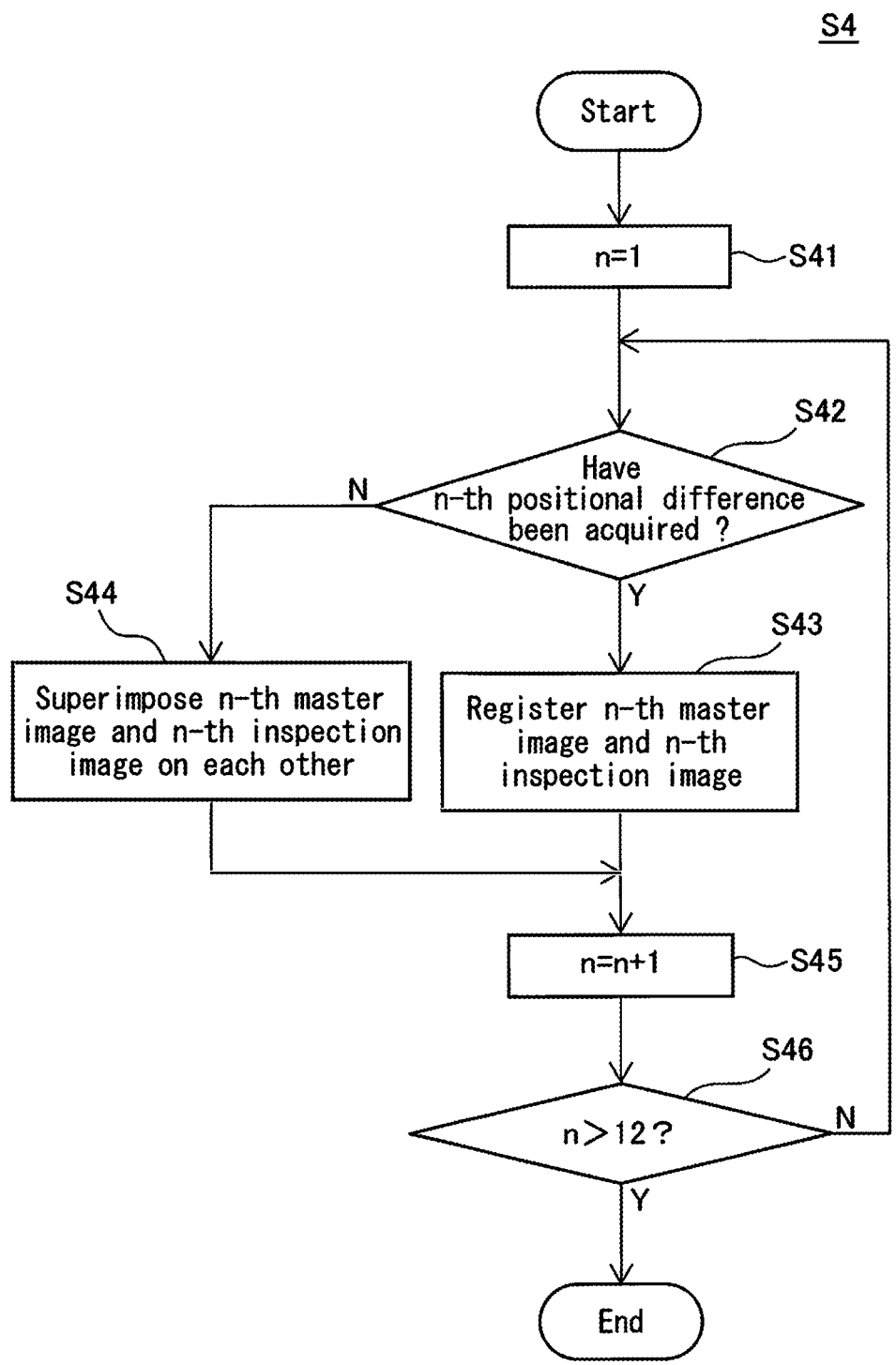
FIG. 18 is a flow chart illustrating an example of the operation process of step S4 in FIG. 14.
Figure 19:
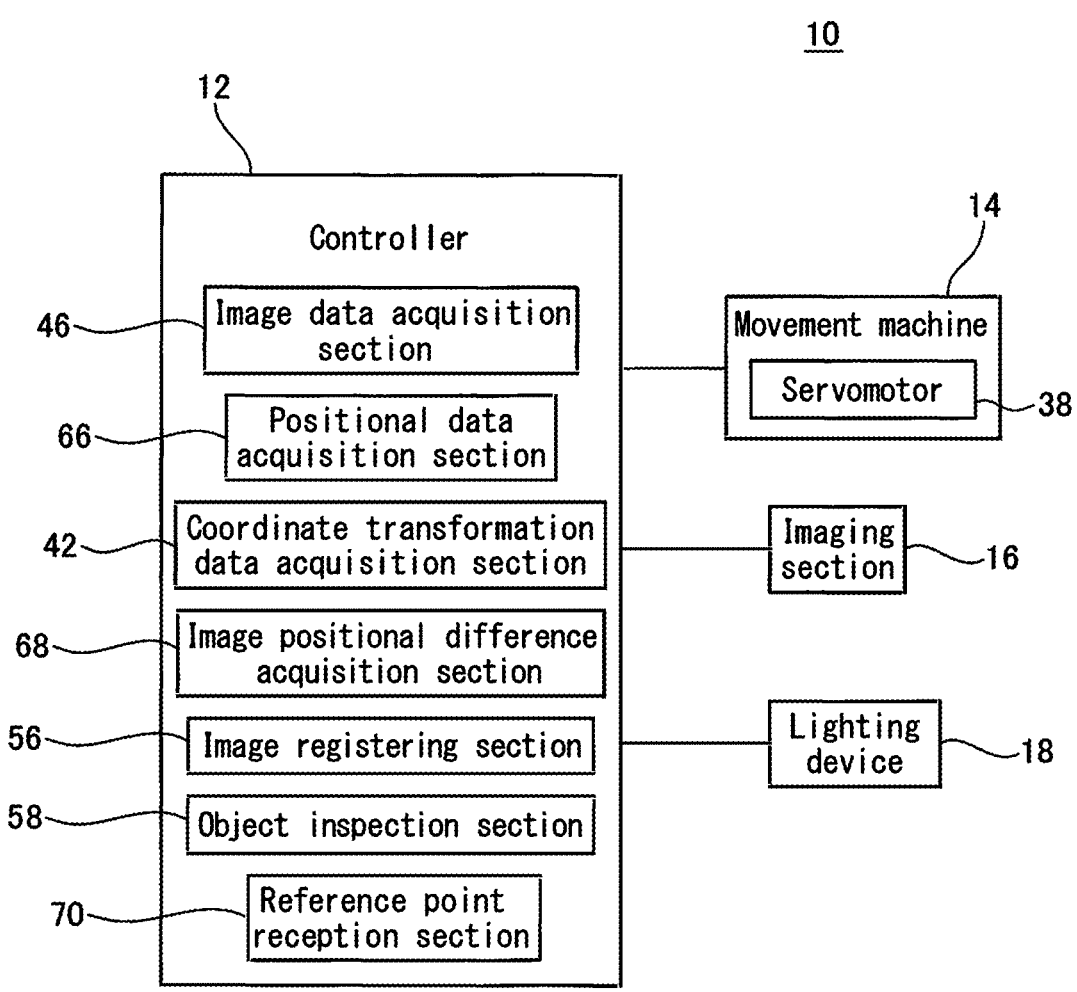
FIG. 19 is a block diagram illustrating another function of the object inspection system.

With reference to FIG. 18, in step S43, the controller 12 functions as the image registering section 56 (FIG. 2) to register the n-th master image and the n-th inspection image with each other, similarly as in the above-described embodiment. If the number "n" is set as n=1 at the start of this step S43, the controller 12 shifts the first master image 40 or the first inspection image 48, 50, 52, 53 on the basis of the first positional difference $\delta$, $\theta$, $\alpha$, M acquired in step S33, so as to register these two images.

When the positional difference $\delta$, $\theta$, $\alpha$ in the first inspection image 48, 50, 52 is calculated in step S33, in this step S43, the controller 12 functions as the image registering section 56 (FIG. 2) and shifts the first inspection image 48, 50, 52 to register the first master image 40 and the first inspection image 48, 50, 52.

When the positional difference $\delta$, $\theta$, $\alpha$ in the first master image 40 is calculated in step S33, in this step S43, the controller 12 shifts the first master image 40 to register the first master image 40 and the first inspection image 48, 50, 52. As a result, the image of the first object $W_1$ in the first master image 40 and the image of the second object $W_2$ in the inspection image 48 can be coincided with each other in the image coordinate system $C_I$.

Next, in step S5 illustrated in FIG. 14, the controller 12 functions as the object inspection section 58 (FIG. 2) to inspect whether or not there is any visually recognizable error in the second object $W_2$ with respect to the first object $W_1$ similarly as the above-described object inspection system 10.

As described above, according to this embodiment, if there is a displacement between the master image and the inspection image, these two images can be registered with each other using the positional data of the movement machine 14. Due to this, it is possible to reduce the work for registering and shorten the time therefor.

Figure 30:
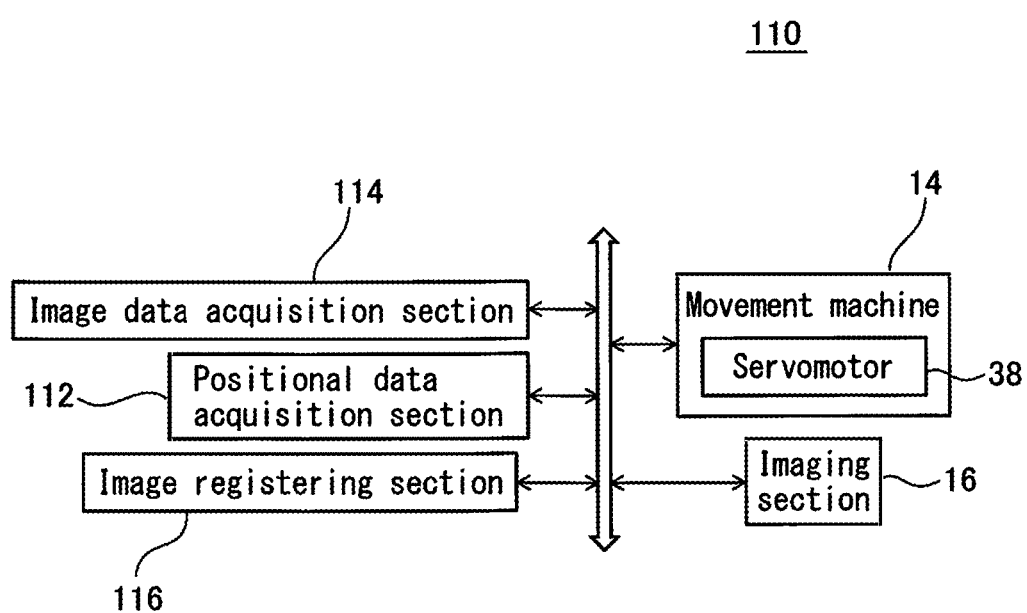
FIG. 30 is a block diagram illustrating an object inspection system according to still another embodiment.

Next, with reference to FIG. 30, an object inspection system 110 according to still another embodiment will be described. The object inspection system 110 includes the movement machine 14, the imaging section 16, a positional data acquisition section 112, an image data acquisition section 114, and an image registering section 116.

The positional data acquisition section 112, the image data acquisition section 114, and the image registering section 116 may be constituted by individual computes or by a single computer.

The positional data acquisition section 112 acquires the reference positional data of the movement machine 14 when the movement machine 14 disposes the first object $W_1$ and the imaging section 16 at the reference relative position, and acquires the inspection positional data of the movement machine 14 when the movement machine 14 disposes the second object $W_2$ and the imaging section 16 at the inspection relative position.

The image data acquisition section 114 acquires the master image imaged by the imaging section 16 at the reference relative position, and acquires the inspection image imaged by the imaging section 16 at the inspection relative position.

The image registering section 116 registers the master image and the inspection image in the image coordinate system $C_I$, using the reference positional data, the inspection positional data, and the known positional relation between the robot coordinate system $C_R$ and the image coordinate system $C_I$.

For example, the image registering section 116 pre-stores a data table representing the relation between the coordinates in the robot coordinate system $C_R$ and the coordinates in the image coordinate system $C_I$, and applies the reference positional data and the inspection positional data in the robot coordinate system $C_R$ to the data table, whereby acquiring the reference positional data and the inspection positional data in the image coordinate system $C_I$.

Then, the image registering section 116 registers the master image and the inspection image on the basis of the reference positional data and the inspection positional data in the image coordinate system $C_I$. In this case, the image registering section 116 can register the master image and the inspection image without acquiring the above-described positional difference.

Note that, the lighting device 18 may be omitted from the object inspection system 10 or 100, wherein the surface $S_I$ of the object $W_1$, $W_2$ may be illuminated by e.g. natural light.

In the embodiments described above, the movement machine 14 is a vertical articulated robot. However, the movement machine 14 may be a parallel link robot or any other machine such as a loader.

Further, in the embodiments described above, the first object $W_1$ and the second object $W_2$ have the same outer shape. However, the first object $W_1$ and the second object $W_2$ may only have a common outer shape at least partially. In this case, the imaging section 16 acquires a master image and an inspection image of the common outer shape.

The present disclosure has been described by means of embodiments but the embodiments described above do not limit the scope of the invention according to the appended claims.

The invention claimed is:

1. An object inspection system comprising:
an imaging section configured to image a first object and a second object which have a common outer shape;
a movement machine configured to move the first object or the second object and the imaging section relative to each other;
a positional data acquisition section configured to acquire first positional data of the movement machine when the movement machine disposes the first object and the imaging section at a first relative position, and acquire second positional data of the movement machine when the movement machine disposes the second object and the imaging section at a second relative position;
an image data acquisition section configured to acquire a first image of the first object imaged by the imaging section at the first relative position, and acquire a second image of the second object imaged by the imaging section at the second relative position; and
an image registering section configured to register the first image and the second image with each other in an image coordinate system of the imaging section, using the first positional data, the second positional data, and a known positional relation between the image coordinate system and a movement machine coordinate system of the movement machine,
wherein the object inspection system is configured to inspect whether or not there is a visually recognizable error in the second object with respect to the first object, based on the first image and the second image that are registered with each other.

2. The object inspection system according to claim 1, further comprising a coordinate transformation data acquisition section configured to acquire coordinate transformation data between the movement machine coordinate system and the image coordinate system,
wherein the image registering section uses the coordinate transformation data as the known positional relation.

3. The object inspection system according to claim 1, further comprising an image positional difference acquisition section configured to acquire a positional difference between the first image and the second image in the image coordinate system, based on the known positional relation, the first positional data, and the second positional data,
wherein the image registering section is configured to register the first image and the second image based on the positional difference.

4. The object inspection system according to claim 3, wherein the image positional difference acquisition section acquires, as the positional difference, a matrix for transforming the second image so as to coincide with the first image, and
wherein the image registering section registers the first image and the second image by transforming the second image with the matrix.

5. The object inspection system according to claim 1, further comprising an object inspection section configured to inspect whether or not there is the error in the second object with respect to the first object using the first image and the second image that are registered with each other.

6. The object inspection system according to claim 1, wherein the imaging section is fixed at a predetermined position, and
wherein the movement machine contacts the first object or the second object at a predetermined target position, and moves the first object or the second object.

7. The object inspection system according to claim 6, wherein the movement machine includes a gripper configured to grip the first object or the second object, and
wherein the first positional data and the second positional data are positional data of the gripper.

8. The object inspection system according to claim 6, wherein the first positional data is positional data of a reference point on the first object moved by the movement machine, and
wherein the second positional data is positional data of a second reference point on the second object moved by the movement machine, the second reference point corresponding to the reference point.

9. The object inspection system according to claim 8, further comprising a reference point reception section configured to receive a designation of the reference point.

10. The object inspection system according to claim 6, further comprising a positional displacement acquisition section configured to acquire a positional displacement of the second object with respect to the movement machine from the target position when the movement machine grips the second object, and
wherein the movement machine moves the second object relative to the imaging section so as to cancel the positional displacement, and positions the second object and the imaging section at the second relative position, or the image registering section registers the first image and the second image using the positional displacement.

11. The object inspection system according to claim 1, wherein the image registering section registers the first image and the second image by:

moving the first image or the second image on a plane perpendicular to an optical axis of the imaging section;

rotating the first image or the second image about the optical axis; or enlarging or reducing the first image or the second image.

12. The object inspection system according to claim 1, wherein the positional data acquisition section includes a simulation section configured to acquire the first positional data by operating in a model environment an imaging section model which models the imaging section and a machine model which models the movement machine.

13. An object inspection method comprising:

acquiring first positional data of a movement machine when the movement machine disposes a first object and an imaging section at a first relative position;

acquiring a first image of the first object imaged by the imaging section at the first relative position;

acquiring second positional data of the movement machine when the movement machine disposes a second object and the imaging section at a second relative position, the first object and the second object having a common outer shape;

acquiring a second image of the second object imaged by the imaging section at the second relative position;

registering the first image and the second image with each other in an image coordinate system of the imaging section, using the first positional data, the second positional data, and a known positional relation between the image coordinate system and a movement machine coordinate system of the movement machine; and inspecting whether or not there is a visually recognizable error in the second object with respect to the first object, based on the first image and the second image that are registered with each other.

* * * * *